United States Patent
Ringold et al.

(10) Patent No.: US 9,828,302 B2
(45) Date of Patent: Nov. 28, 2017

(54) STRENGTHENED COMPOSITE PRODUCTS AND METHODS FOR MAKING AND USING SAME

(71) Applicant: Georgia-Pacific Chemicals LLC, Atlanta, GA (US)

(72) Inventors: Clay E. Ringold, Decatur, GA (US); Kelly A. Shoemake, Atlanta, GA (US); Arun Narayan, Duluth, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

(21) Appl. No.: 15/185,081

(22) Filed: Jun. 17, 2016

(65) Prior Publication Data
US 2016/0368832 A1    Dec. 22, 2016

Related U.S. Application Data

(60) Provisional application No. 62/182,068, filed on Jun. 19, 2015.

(51) Int. Cl.
| | |
|---|---|
| C05G 3/00 | (2006.01) |
| C05D 1/00 | (2006.01) |
| C05C 9/00 | (2006.01) |
| C08K 7/14 | (2006.01) |

(52) U.S. Cl.
CPC ........... C05G 3/0029 (2013.01); C05C 9/005 (2013.01); C05D 1/005 (2013.01); C05G 3/0035 (2013.01); C05G 3/0041 (2013.01); C08K 7/14 (2013.01)

(58) Field of Classification Search
CPC ........ D21H 21/00; D21H 27/00; D21H 17/55; D21H 21/20; C08G 73/06; Y10T 428/24479
USPC ......................... 528/492, 335, 422
See application file for complete search history.

(56) References Cited

U.S. PATENT DOCUMENTS

| | | | |
|---|---|---|---|
| 2007/0264896 A1* | 11/2007 | Smith ................. | D21H 27/005 442/381 |
| 2014/0020858 A1* | 1/2014 | Ringold ................ | D21H 21/20 162/164.6 |

* cited by examiner

*Primary Examiner* — Camie S Thompson
(74) *Attorney, Agent, or Firm* — Ram W. Sabnis

(57) ABSTRACT

The disclosure provides strengthened products, including strengthened fibrous composite products and methods for making and using same and strengthened particulates, such as particulate fertilizer products, and methods for making and using same. The fibrous composite product can include a plurality of fibers and an at least partially cured strengthening resin. The fertilizer composition can include a particulate core that can include a plant nutrient, at least one coating layer of the strengthening resin, and at least one coating layer of a water insoluble material. The strengthening resin can include one or more aldehyde-based resins and one or more crosslinked resins. The crosslinked resin can include one or more polyamines at least partially crosslinked by one or more symmetric crosslinks and can include one or more azetidinium functional groups.

21 Claims, 4 Drawing Sheets

STRENGTHENED COMPOSITE PRODUCTS AND METHODS FOR MAKING AND USING SAME

CROSS-REFERENCE TO RELATED APPLICATION

This application claims priority to U.S. Provisional Patent Application No. 62/182,068, filed on Jun. 19, 2015, which is incorporated by reference herein.

BACKGROUND

Field

Embodiments described generally relate to composite products and methods for making and using same. More particularly, such embodiments relate to strengthened fibrous composite products, such as fiberglass products, and methods for making and using same, as well as to strengthened coated particulates, such as particulate fertilizer products, and methods for making and using same.

Description of the Related Art

Sheets or mats of non-woven fibers, e.g., glass fibers ("fiberglass"), are finding increasing application in the building materials industry. Fiberglass mats are typically used in, among others, insulation products, flooring products, wall panel products, and roofing products. Fiberglass mats are usually made commercially by a wet-laid process that involves the addition of a binder or adhesive solution to the glass fiber mat to bind and hold the fibers together.

Depending on the particular fiberglass product and application, different mechanical properties are desirable and/or must be met, such as dry tensile strength, tear strength, cure time, and internal bond strength. Both dry tensile strength and tear strength are important properties for a fiberglass mat in roofing material applications. Tear strength provides an estimate as to the ability of a roofing product, such as a shingle incorporating the fiberglass mat, to resist wind forces. As the tear strength of a fiberglass mat increases, the level of wind forces the roofing product can resist also increases, thereby providing a more reliable and durable roofing product. Frequently, fiberglass mats do not meet minimum dry tensile strength and tear strength specifications that are required for the fiberglass mat to be used in roofing applications.

Controlled release fertilizers can provide desirable properties, such as reduced plant phytotoxicity of fertilizer components, reduced frequency of application, and increased efficiency of nutrient delivery to plants. Solid fertilizers can be provided in many forms, such as granular, pelletized, compounded, pastilled, and prilled fertilizers. Coatings can be utilized on solid fertilizers to provide controlled release and/or to protect the fertilizer during shipping, storage, and/or application. There is an ongoing need to provide coatings of increased strength that are still biodegradable and can provide controlled release of the fertilizer.

There is a need, therefore, for materials suitable for providing improved strength properties to various materials. In particular, there is a need for strengthened fiber products having improved dry tensile strength and/or tear strength properties and methods for making and using same. There also is a need for strengthened coatings for fertilizers and methods for making and using the same.

SUMMARY

Strengthened products, including strengthened fibrous composite products and methods for making and using same and strengthened particulates, such as particulate fertilizer products, and methods for making and using same are provided. In some examples, a fibrous composite product can include a plurality of fibers and an at least partially cured strengthening resin. The strengthening resin, prior to curing, can include about 85% to about 99.5% of an aldehyde-based resin and about 0.5% to about 15% of a crosslinked resin, based on a combined solids weight of the aldehyde based resin and the crosslinked resin. The crosslinked resin can include a polyamine at least partially crosslinked by a symmetric crosslink and can have azetidinium functional groups. The fibrous composite product can include about 10% to about 40% of the at least partially cured strengthening resin, based on a combined solids weight of the plurality of fibers and the at least partially cured strengthening resin.

In other examples, a fibrous composite product can include a fiber web and an at least partially cured strengthening resin. The strengthening resin, prior to curing, can include about 85% to about 99.5% of a urea-formaldehyde resin and about 0.5% to about 15% of a crosslinked resin, based on a combined solids weight of the urea-formaldehyde resin and the crosslinked resin. The crosslinked resin can include a polyamidoamine at least partially crosslinked by a symmetric crosslink and can have azetidinium functional groups. The fibrous composite product can include about 10% to about 20% of the at least partially cured strengthening resin, based on a combined solids weight of the plurality of fibers and the at least partially cured strengthening resin.

In some examples, a method for making a fibrous composite product can include contacting a plurality of fibers with a strengthening resin. The strengthening resin can include about 85% to about 99.5% of an aldehyde-based resin and about 0.5% to about 15% of a crosslinked resin, based on a combined solids weight of the aldehyde-based resin and the crosslinked resin. The crosslinked resin can include a polyamine at least partially crosslinked by a symmetric crosslink and can have azetidinium functional groups. The method can also include at least partially curing the strengthening resin in contact with the plurality of fibers to produce the fibrous composite product. The fibrous composite product can include about 10% to about 40% of the at least partially cured strengthening resin, based on a combined solids weight of the plurality of fibers and the at least partially cured strengthening resin.

In some examples, a fertilizer composition can include a particulate core containing a plant nutrient, at least one coating layer of a strengthening resin containing an aldehyde-based resin, and, optionally, at least one coating layer of a water insoluble material, such as a wax. The aldehyde-based resin can be a urea-formaldehyde resin. The strengthening resin can include the aldehyde-based resin blended with a crosslinked resin. The crosslinked resin can include a polyamidoamine backbone. The crosslinked resin can include a polyamidoamine-epihalohydrin. The strengthening resin can be present in an amount of about 1% to about 50% by weight relative to the weight of the plant nutrient core, more particularly about 2% to about 15% by weight relative to the weight of the plant nutrient core. The water insoluble material can be present in an amount of about 0.01% to about 5% by weight relative to the weight of the plant nutrient core. The strengthening resin and the water insoluble material can be present in a weight ratio of 1:5 to about 20:1. The fertilizer can include at least two coating layers of the strengthening resin and at least one coating layer of the water insoluble material. In particular, the coating layers may alternate. The fertilizer composition can include a plurality of coating layers of the strengthening resin between layers of the water insoluble material, such as at least two, at least three, at least four, or at least 5 coating layers of the strengthening resin. The water insoluble material can be selected from the group consisting of waxes, fatty acids, fatty acid esters, C9 or greater alcohols, and combinations thereof. In some embodiments, the composition can comprise the following layers in order from inner most to outer most: the particulate core comprising the plant nutrient; at least one layer of the strengthening resin; at least one layer of the water insoluble material; at least one further layer of the strengthening resin; and at least one further layer of the water insoluble material. The composition may further comprise a layer of the strengthening resin as the outer most layer.

In other examples, a method of making a fertilizer composition can include applying at least one coating layer of a strengthening resin containing an aldehyde-based resin to particles of a plant nutrient. In one example, optionally, at least one coating layer of a water insoluble material can be applied to the plant nutrient particles. The fertilizer composition can be cured. In some examples, at least two coating layers of the strengthening resin and at least one coating layer of the water insoluble material can be applied to the plant nutrient particles. In other examples, the coating layers can be applied to the plant nutrient particles in an alternating fashion. In other examples, at least three coating layers of the strengthening resin can be applied to the plant nutrient particles. In one or more embodiments, the method can comprise the following steps: applying to the plant nutrient particles at least one coating layer of the strengthening resin at a temperature of about 50° C. to about 200° C.; curing the at least one coating layer of the strengthening resin at a temperature of about 50° C. to about 200° C. for a time of about 1 minute to about 20 minutes; applying at least one coating layer of the water insoluble material; and further curing the composition.

BRIEF DESCRIPTION OF THE FIGURES

Figure 1:
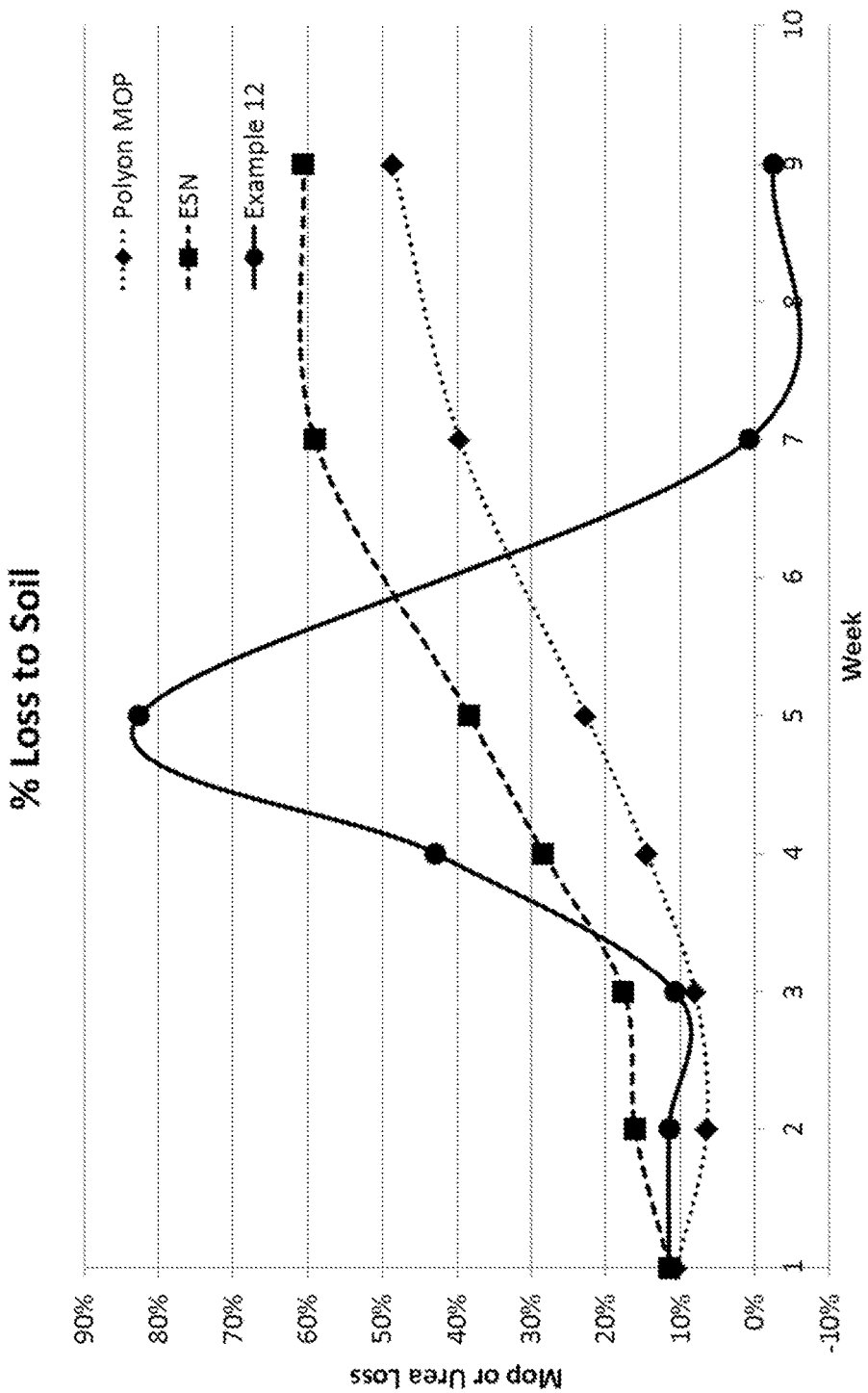
Figure 2:
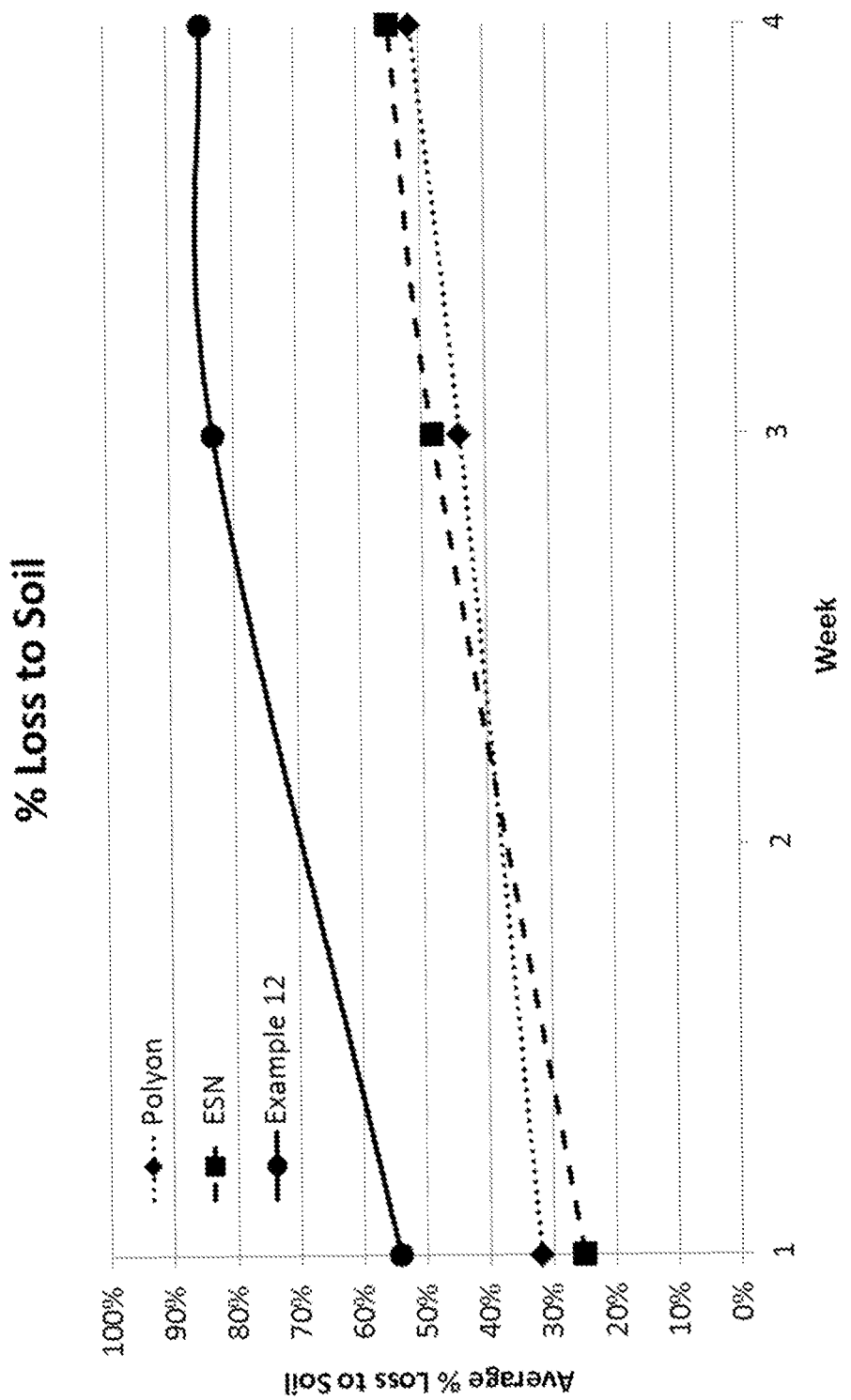
Figure 3:
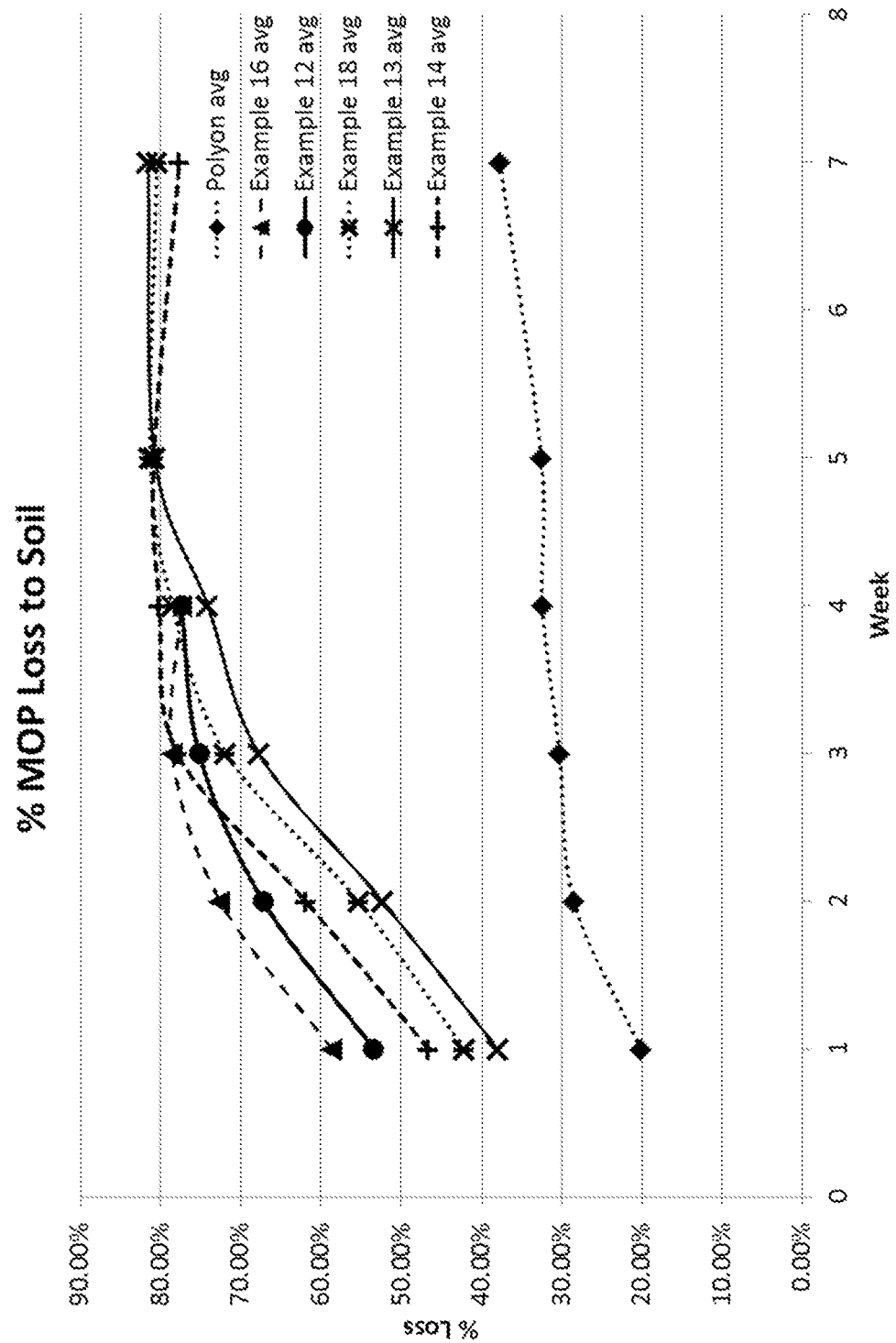
Figure 4:
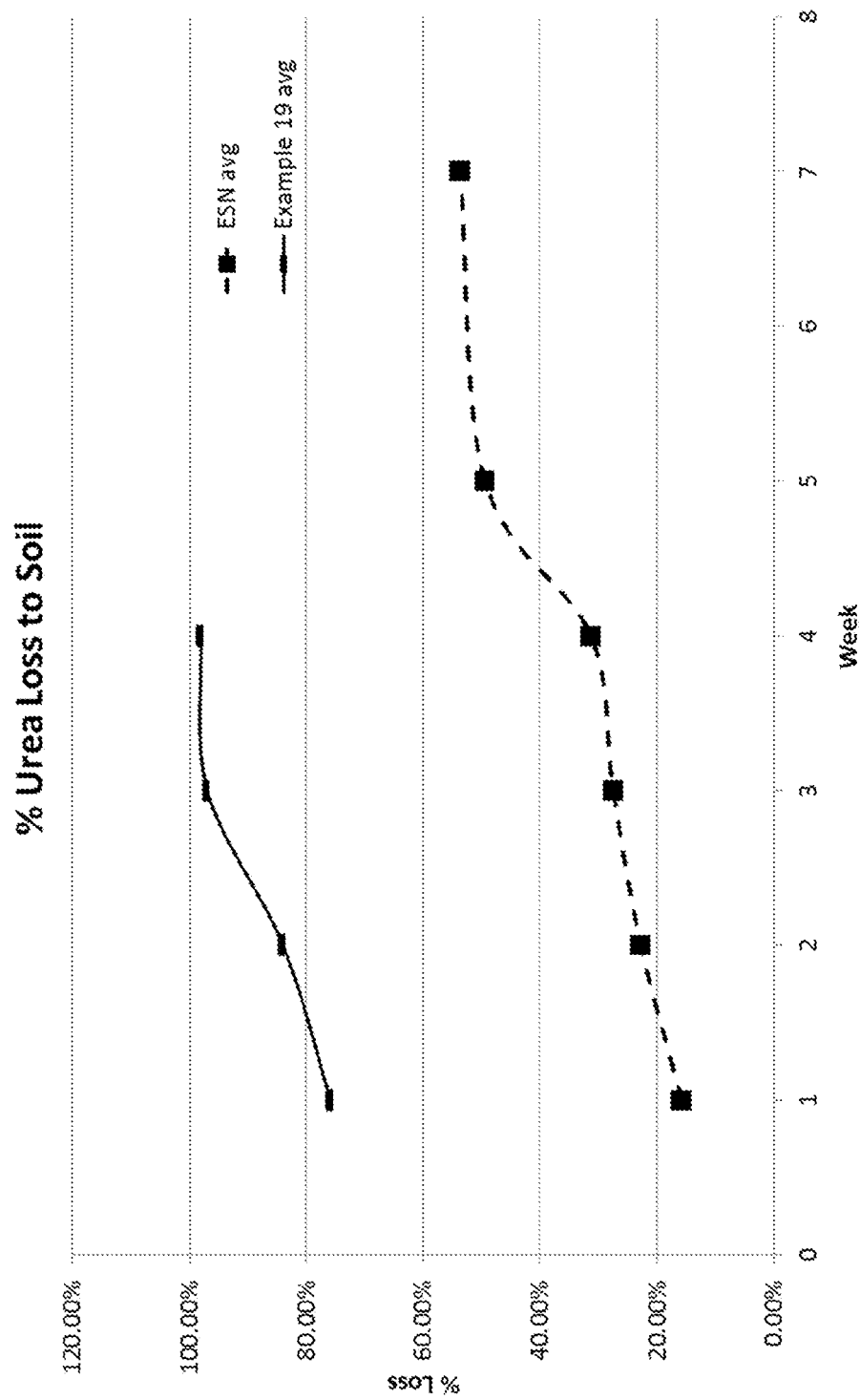

Having thus described the disclosure in the foregoing terms, reference will now be made to the accompanying figures, where:

FIG. 1 is a graph showing the percent loss of muriate of potash (MOP) to soil in testing of a composition according to an embodiment of the present disclosure versus two comparative formulations;

FIG. 2 is a graph showing the average loss of MOP to soil in testing of a composition according to an embodiment of the present disclosure versus two comparative formulations;

FIG. 3 is a graph showing the average loss of MOP to soil in testing of five compositions according to embodiments of the present disclosure versus a comparative formulation; and FIG. 4 is graph showing the average loss of urea to soil in testing of a composition according to an embodiment of the present disclosure versus a comparative formulation.

DETAILED DESCRIPTION

It has been surprisingly and unexpectedly discovered that blending one or more aldehyde-based resins and one or more crosslinked resins produces a strengthening resin with improved performance properties when mixed, blended, or otherwise contacted with fibers (e.g., glass fibers). The crosslinked resin can be or include one or more polyamines, e.g., a polyamidoamine backbone, at least partially crosslinked by one or more symmetric crosslinks and can have one or more azetidinium functional groups. The strengthening resin surprisingly and unexpectedly enhances the dry tensile strength of glass fiber products. Surprisingly, the blends of the aldehyde-based resin and the crosslinked resin provide a synergistic effect as a dry tensile strengthening agent for fibrous composite products, such as fiberglass products. In some examples, the polyamine of the crosslinked resin can also be at least partially crosslinked by one or more epihalohydrin crosslinks. In some examples, the crosslinked resin can be or include one or more polyamines at least partially crosslinked by a bridging moiety derived from a symmetric crosslinker, can be at least partially crosslinked by a second bridging moiety derived from one or more epihalohydrins, and can have one or more azetidinium functional groups.

A fibrous composite product can include a plurality of fibers (e.g., glass fibers) and an at least partially cured strengthening resin, which prior to curing, the strengthening resin can include one or more aldehyde-based resins and one or more crosslinked resins. The plurality of fibers can be or include glass fibers, mineral fibers, synthetic fibers, or any mixture thereof. The plurality of fibers can be in the form of a web. For example, the plurality of fibers can be in the form of a non-woven web and/or a woven web. The crosslinked resin can include one or more polyamidoamine backbones at least partially crosslinked by one or more symmetric crosslinks (e.g., a crosslink derived from bisacrylamide) and/or at least partially crosslinked by one or more epihalohydrin crosslinks (e.g., a crosslink derived from epichlorohydrin). The aldehyde-based resin can be present in the strengthening resin in an amount of about 85% to about 99.5%, based on a combined solids weight of the aldehyde-based resin and the crosslinked resin. The at least partially cured strengthening resin can be present in the fibrous composite product in an amount of about 10% to about 40%, based on a combined solids weight of the plurality of fibers and the at least partially cured strengthening resin. The fibrous composite product can have an average dry tensile strength of about 38.6 kg/7.62 cm (about 85 lbs/3") to about 90.7 kg/7.62 cm (about 200 lbs/3"), as measured according to TAPPI/ANSI T 1009 om-10. The fibrous composite product can have an average Elmendorf tear strength of about 400 gf to about 800 gf. In at least one example, the fibrous composite product can have an average dry tensile strength of about 38.6 kg/7.62 cm (about 85 lbs/3") to about 90.7 kg/7.62 cm (about 200 lbs/3"), as measured according to TAPPI/ANSI T 1009 om-10, and an average Elmendorf tear strength of about 400 gf to about 800 gf.

In some examples, the crosslinked resin can be or include one or more reaction products of a crosslinked intermediate compound and the epihalohydrin. In some examples, the crosslinked intermediate compound can be a reaction product of a polyamidoamine and a bisacrylamide. In other examples, the crosslinked intermediate compound can be a reaction product of a polyamidoamine and N,N'-methylenebisacrylamide. In some examples, the epihalohydrin crosslink can be derived from epichlorohydrin. The aldehyde-based resin can be or include one or more urea-formaldehyde resins, one or more phenol-formaldehyde resins, one or more resorcinol-formaldehyde resins, one or more phenol-resorcinol-formaldehyde resins, one or more phenol-urea-formaldehyde resins, one or more melamine-formaldehyde resins, one or more melamine-urea-formaldehyde resins, one or more phenol-melamine-formaldehyde resins, or any mixture thereof.

The fibrous composite product can have an average dry tensile strength of about 34 kg/7.62 cm sample (about 75 lbs/3"), about 36.3 kg/7.62 cm (about 80 lbs/3"), about 38.6 kg/7.62 cm (about 85 lbs/3"), or about 40.8 kg/7.62 cm (about 90 lbs/3") to about 43.1 kg/7.62 cm (about 95 lbs/3"), about 45.4 kg/7.62 cm (about 100 lbs/3"), about 47.6 kg/7.62 cm (about 105 lbs/3"), about 49.9 kg/7.62 cm (about 110 lbs/3"), about 52.2 kg/7.62 cm (about 115 lbs/3"), about 54.4 kg/7.62 cm (about 120 lbs/3"), about 56.7 kg/7.62 cm (about 125 lbs/3"), about 59 kg/7.62 cm (about 130 lbs/3"), about 61.2 kg/7.62 cm (about 135 lbs/3"), about 63.5 kg/7.62 cm (about 140 lbs/3"), about 65.8 kg/7.62 cm (about 145 lbs/3"), about 68 kg/7.62 cm (about 150 lbs/3"), about 70.3 kg/7.62 cm (about 155 lbs/3"), about 72.6 kg/7.62 cm (about 160 lbs/3"), about 77.1 kg/7.62 cm (about 170 lbs/3"), about 81.6 kg/7.62 cm (about 180 lbs/3"), about 86.2 kg/7.62 cm (about 190 lbs/3"), about 90.7 kg/7.62 cm (about 200 lbs/3"), about 95.3 kg/7.62 cm (about 210 lbs/3"), about 99.8 kg/7.62 cm (about 220 lbs/3"), or about 104.3 kg/7.62 cm (about 230 lbs/3"), as measured according to TAPPI/ANSI T 1009 om-10. For example, the fibrous composite product can have an average dry tensile strength of about 34 kg/7.62 cm (about 75 lbs/3") to about 104.3 kg/7.62 cm (about 230 lbs/3"), about 34 kg/7.62 cm (about 75 lbs/3") to about 90.7 kg/7.62 cm (about 200 lbs/3"), about 34 kg/7.62 cm (about 75 lbs/3") to about 68 kg/7.62 cm (about 150 lbs/3"), about 36.3 kg/7.62 cm (about 80 lbs/3") to about 104.3 kg/7.62 cm (about 230 lbs/3"), about 36.3 kg/7.62 cm (about 80 lbs/3") to about 90.7 kg/7.62 cm (about 200 lbs/3"), about 36.3 kg/7.62 cm (about 80 lbs/3") to about 68 kg/7.62 cm (about 150 lbs/3"), about 38.6 kg/7.62 cm (about 85 lbs/3") to about 104.3 kg/7.62 cm (about 230 lbs/3"), about 38.6 kg/7.62 cm (about 85 lbs/3") to about 90.7 kg/7.62 cm (about 200 lbs/3"), about 38.6 kg/7.62 cm (about 85 lbs/3") to about 68 kg/7.62 cm (about 150 lbs/3"), about 38.6 kg/7.62 cm (about 85 lbs/3") to about 61.2 kg/7.62 cm (about 135 lbs/3"), about 38.6 kg/7.62 cm (about 85 lbs/3") to about 56.7 kg/7.62 cm (about 125 lbs/3"), about 40.8 kg/7.62 cm (about 90 lbs/3") to about 104.3 kg/7.62 cm (about 230 lbs/3"), about 40.8 kg/7.62 cm (about 90 lbs/3") to about 90.7 kg/7.62 cm (about 200 lbs/3"), about 40.8 kg/7.62 cm (about 90 lbs/3") to about 68 kg/7.62 cm (about 150 lbs/3"), about 40.8 kg/7.62 cm (about 90 lbs/3") to about 61.2 kg/7.62 cm (about 135 lbs/3"), about 40.8 kg/7.62 cm (about 90 lbs/3") to about 56.7 kg/7.62 cm (about 125 lbs/3"), about 43.1 kg/7.62 cm (about 95 lbs/3") to about 104.3 kg/7.62 cm (about 230 lbs/3"), about 43.1 kg/7.62 cm (about 95 lbs/3") to about 90.7 kg/7.62 cm (about 200 lbs/3"), about 43.1 kg/7.62 cm (about 95 lbs/3") to about 68 kg/7.62 cm (about 150 lbs/3"), about 43.1 kg/7.62 cm (about 95 lbs/3") to about 61.2 kg/7.62 cm (about 135 lbs/3"), or about 43.1 kg/7.62 cm (about 95 lbs/3") to about 56.7 kg/7.62 cm (about 125 lbs/3"), as measured according to TAPPI/ANSI T 1009 om-10. In some specific examples, the fibrous composite product can have an average dry tensile strength of about 38.6 kg/7.62 cm (about 85 lbs/3") to about 90.7 kg/7.62 cm (about 200 lbs/3") or about 40.8 kg/7.62 cm (about 90 lbs/3") to about 68 kg/7.62 cm (about 150 lbs/3"), as measured according to TAPPI/ANSI T 1009 om-10. The test method "TAPPI/ANSI T 1009 om-10" that can be used to measure the average dry tensile strength of the fibrous composite products and other materials refers to the Technical Association of the Pulp and Paper Industry (TAPPI) and Approved American National Standard (ANSI) test method—Tensile Strength and Elongation at Break for Fiber Glass Mats, TAPPI/ANSI T 1009 om-10 test method, using a 7.62 cm (3 in) sample size of the fibrous composite product or other sample.

The fibrous composite product can have an average Elmendorf tear resistance or tear strength of about 300 gf, about 350 gf, about 400 gf, about 425 gf, about 450 gf, about 475 gf, or about 500 gf to about 525 gf, about 550 gf, about 575 gf, about 600 gf, about 650 gf, about 700 gf, about 750 gf, about 800 gf, or about 900 gf, as measured according to T 1006 sp-15. For example, the fibrous composite product can have an average Elmendorf tear strength of about 400 gf to about 800 gf, about 450 gf to about 800 gf, about 500 gf to about 800 gf, about 400 gf to about 700 gf, about 450 gf to about 700 gf, about 500 gf to about 700 gf, about 525 gf to about 700 gf, about 550 gf to about 700 gf, about 450 gf to about 650 gf, about 500 gf to about 650 gf, about 525 gf to about 650 gf, about 550 gf to about 650 gf, about 450 gf to about 600 gf, about 500 gf to about 600 gf, about 525 gf to about 600 gf, or about 550 gf to about 600 gf, as measured according to T 1006 sp-15. In some examples, the fibrous composite product can have an average Elmendorf tear strength of about 400 gf to about 800 gf, about 500 gf to about 700 gf, about 500 gf to about 650 gf, about 500 gf to about 625 gf, or about 500 gf to about 600 gf, as measured according to T 1006 sp-15. The T 1006 sp-16 test method that can be used to measure the average Elmendorf tear resistance or tear strength refers to the Technical Association of the Pulp and Paper Industry (TAPPI) test method—Testing of fiber glass mats: use of modified TAPPI procedures for sampling and lot acceptance, stiffness, tear resistance, and thickness, T 1006 sp-15 test method, using a 1,600-g pendulum.

The average Elmendorf tear resistance or tear strength can be measured with a Thwing-Albert Pro Tear (1,600 g pendulum). In measuring the Elmendorf tear strength, the instrument can be leveled and calibrated before testing. Test samples can be cut to a width of 63 mm (2.48 in.) in the tearing direction and a length of about 75 mm (3 in.). The samples can be long enough to be held by the full width of each sample clamp. The test samples can be placed in the clamps of the tester while ensuring that the bottom of each sample rests squarely on the bottom of the sample clamps. The sample can be aligned with the front edge of the pendulum clamp. Any excess material can be allowed to hang over the rear of the stationary clamp. The clamps were then closed. The cutter handle can be pressed all the way down to cut a 20 mm (0.79 in) slit in the sample. The "test" key of the instrument can be pressed and the pendulum can be allowed to make one full swing in the tearing direction. The pendulum can be stopped on the return swing and gently lowered until the pendulum rested against the pendulum stop.

The average dry tensile strength values and the average Elmendorf tear resistance or tear strength values, as discussed and described herein, were measured on fiber mats or fiber webs that were composed of randomly oriented glass fibers. The fiber mats or fiber webs did not have a machine direction and a cross-direction, but instead generally had the same fiber orientation from any direction or angle, which was a random, non-woven orientation. An aqueous slurry of the glass fibers was poured onto a synthetic mat that allowed the water to run off, but retained the glass fibers in a random orientation as a fiber mat or web. Accordingly, the average dry tensile strength values and the average Elmendorf tear resistance or tear strength values can be considered as a total dry tensile strength or total Elmendorf tear strength value that would correspond to an average of the machine direction and the cross-direction values measured for fiber mats or fiber webs made on a large scale process that have a machine direction and a cross-direction.

The fibrous composite product can have a basis weight ("BW") of about 0.68 kg/9.29 m$^2$ (about 1.5 lbs/100 ft$^2$), about 0.70 kg/9.29 m$^2$ (about 1.55 lbs/100 ft$^2$), or about 0.73 kg/9.29 m$^2$ (about 1.6 lbs/100 ft$^2$) to about 0.75 kg/9.29 m$^2$ (about 1.65 lbs/100 ft$^2$), about 0.76 kg/9.29 m$^2$ (about 1.67 lbs/100 ft$^2$), about 0.76 kg/9.29 m$^2$ (about 1.68 lbs/100 ft$^2$), about 0.77 kg/9.29 m$^2$ (about 1.69 lbs/100 ft$^2$), about 0.77 kg/9.29 m$^2$ (about 1.7 lbs/100 ft$^2$), about 0.79 kg/9.29 m$^2$ (about 1.75 lbs/100 ft$^2$), about 0.82 kg/9.29 m$^2$ (about 1.8 lbs/100 ft$^2$), about 0.84 kg/9.29 m$^2$ (about 1.85 lbs/100 ft$^2$), about 0.86 kg/9.29 m$^2$ (about 1.9 lbs/100 ft$^2$), about 0.88 kg/9.29 m$^2$ (about 1.95 lbs/100 ft$^2$), or about 0.91 kg/9.29 m$^2$ (about 2 lbs/100 ft$^2$). The fibrous composite product can also have a basis weight of greater than 0.68 kg/9.29 m$^2$ (greater than 1.5 lbs/100 ft$^2$), greater than 0.70 kg/9.29 m$^2$ (greater than 1.55 lbs/100 ft$^2$), or greater than 0.73 kg/9.29 m$^2$ (greater than 1.6 lbs/100 ft$^2$) to greater than 0.75 kg/9.29 m$^2$ (greater than 1.65 lbs/100 ft$^2$), greater than 0.76 kg/9.29 m$^2$ (greater than 1.67 lbs/100 ft$^2$), greater than 0.76 kg/9.29 m$^2$ (greater than 1.68 lbs/100 ft$^2$), greater than 0.77 kg/9.29 m$^2$ (greater than 1.7 lbs/100 ft$^2$), greater than 0.79 kg/9.29 m$^2$ (greater than 1.75 lbs/100 ft$^2$), greater than 0.82 kg/9.29 m$^2$ (greater than 1.8 lbs/100 ft$^2$), greater than 0.84 kg/9.29 m$^2$ (greater than 1.85 lbs/100 ft$^2$), greater than 0.86 kg/9.29 m$^2$ (greater than 1.9 lbs/100 ft$^2$), greater than 0.88 kg/9.29 m$^2$ (greater than 1.95 lbs/100 ft$^2$), or greater than 0.91 kg/9.29 m$^2$ (greater than 2 lbs/100 ft$^2$). For example, the fibrous composite product can have a basis weight of about 0.68 kg/9.29 m$^2$ (about 1.5 lbs/100 ft$^2$) to about 0.91 kg/9.29 m$^2$ (about 2 lbs/100 ft$^2$), about 0.73 kg/9.29 m$^2$ (about 1.6 lbs/100 ft$^2$) to about 0.91 kg/9.29 m$^2$ (about 2 lbs/100 ft$^2$), about 0.75 kg/9.29 m$^2$ (about 1.65 lbs/100 ft$^2$) to about 0.91 kg/9.29 m$^2$ (about 2 lbs/100 ft$^2$), about 0.76 kg/9.29 m$^2$ (about 1.67 lbs/100 ft$^2$) to about 0.91 kg/9.29 m$^2$ (about 2 lbs/100 ft$^2$), about 0.76 kg/9.29 m$^2$ (about 1.68 lbs/100 ft$^2$) to about 0.91 kg/9.29 m$^2$ (about 2 lbs/100 ft$^2$), about 0.77 kg/9.29 m$^2$ (about 1.7 lbs/100 ft$^2$) to about 0.91 kg/9.29 m$^2$ (about 2 lbs/100 ft$^2$), about 0.68 kg/9.29 m$^2$ (about 1.5 lbs/100 ft$^2$) to about 0.86 kg/9.29 m$^2$ (about 1.9 lbs/100 ft$^2$), about 0.73 kg/9.29 m$^2$ (about 1.6 lbs/100 ft$^2$) to about 0.86 kg/9.29 m$^2$ (about 1.9 lbs/100 ft$^2$), about 0.75 kg/9.29 m$^2$ (about 1.65 lbs/100 ft$^2$) to about 0.86 kg/9.29 m$^2$ (about 1.9 lbs/100 ft$^2$), about 0.76 kg/9.29 m$^2$ (about 1.67 lbs/100 ft$^2$) to about 0.86 kg/9.29 m$^2$ (about 1.9 lbs/100 ft$^2$), about 0.76 kg/9.29 m$^2$ (about 1.68 lbs/100 ft$^2$) to about 0.86 kg/9.29 m$^2$ (about 1.9 lbs/100 ft$^2$), or about 0.77 kg/9.29 m$^2$ (about 1.7 lbs/100 ft$^2$) to about 0.86 kg/9.29 m$^2$ (about 1.9 lbs/100 ft$^2$). In some specific examples, the fibrous composite product can have a basis weight of about 0.73 kg/9.29 m$^2$ (about 1.6 lbs/100 ft$^2$) to about 0.82 kg/9.29 m$^2$ (about 1.8 lbs/100 ft$^2$) or about 0.75 kg/9.29 m$^2$ (about 1.65 lbs/100 ft$^2$) to about 0.79 kg/9.29 m$^2$ (about 1.75 lbs/100 ft$^2$), for example, about 0.77 kg/9.29 m$^2$ (about 1.69 lbs/100 ft$^2$).

The fibrous composite product can have a percent of hot-wet retention ("% HW") of about 50%, about 55%, or about 60% to about 65%, about 70%, about 75%, about 80%, about 85%, about 80%, or about 95%. The fibrous composite product can also have a percent of hot-wet retention of greater than 50%, greater than 55%, or greater than 60%, greater than 65%, greater than 70%, greater than 75%, greater than 80%, greater than 85%, greater than 90%, or greater than 95%. For example, the fibrous composite product can have a percent of hot-wet retention of about 50% to about 95%, about 60% to about 85%, about 65% to about 85%, about 65% to about 80%, about 70% to about 85%, or about 70% to about 80%. The percent of hot-wet retention can be determined as the amount of dry tensile strength retained after immersing a sample in an 80° C. water bath for 10 minutes.

The fibrous composite product can have a percent loss of ignition ("% LOI") of about 12%, about 12.5%, or about 13% to about 13.5%, about 14%, about 14.5%, about 15%, about 15.5%, about 16%, about 17%, about 18%, about 19%, about 20%, about 21%, or greater. The fibrous composite product can also have a percent loss of ignition of greater than 12%, greater than 12.5%, or greater than 13% to greater than 13.5%, greater than 14%, greater than 14.5%, greater than 15%, greater than 15.5%, greater than 16%, greater than 17%, greater than 18%, greater than 19%, greater than 20%, or greater than 21%. For example, the fibrous composite product can have a percent loss of ignition of about 12% to about 20%, about 14% to about 20%, about 14% to about 18%, about 14.5% to about 18%, about 15% to about 18%, about 15.5% to about 18%, about 14% to about 16%, about 14.5% to about 16%, about 15% to about 16%, or about 15.5% to about 16%. The percent loss of ignition can be determined for each value by taking the ratio of a sample weight after 30 minutes at 650° C. relative to the original sample weight.

The fibrous composite product can have a dry tensile number ("DT$_N$") of about 3, about 3.1, about 3.2, about 3.3, about 3.4, or about 3.5 to about 3.6, about 3.7, about 3.8, about 3.9, about 4, about 4.1, about 4.2, about 4.3, about 4.4, about 4.5, about 4.6, about 4.7, about 4.8, about 4.9, about 5, about 5.1, about 5.2, about 5.3, about 5.4, or about 5.5 to about 5.6, about 5.7, about 5.8, about 5.9, about 6, or greater. For example, the fibrous composite product can have a dry tensile number of about 3 to about 6, about 3 to about 5, about 3 to about 4, about 3.5 to about 6, about 3.5 to about 5, or about 3.5 to about 4. The DT$_N$ can be determined by the following equation: DT$_N$=(average dry tensile strength)/(% LOI×BW).

The fibrous composite product can include the at least partially cured or fully cured strengthening resin in an amount of about 5%, about 10%, about 15%, or about 20% to about 25%, about 30%, about 35%, about 40%, about 45%, about 50%, about 55%, or about 60%, based on the combined solids weight of the plurality of fibers and the at least partially cured strengthening resin. For example, the fibrous composite product can include at least partially cured or fully cured strengthening resin in an amount of about 5% to about 60%, about 5% to about 50%, about 5% to about 40%, about 5% to about 30%, about 5% to about 20%, about 5% to about 10%, about 10% to about 60%, about 10% to about 50%, about 10% to about 40%, about 10% to about 30%, about 10% to about 20%, about 15% to about 60%, about 15% to about 50%, about 15% to about 40%, about 15% to about 30%, about 15% to about 25%, about 15% to about 20%, about 20% to about 60%, about 20% to about 50%, about 20% to about 40%, about 20% to about 35%, about 20% to about 30%, or about 20% to about 25%, based on the combined solids weight of the plurality of fibers and the at least partially cured strengthening resin. In some specific examples, the fibrous composite product can include at least partially cured or fully cured strengthening resin in an amount of about 10% to about 40% or about 15% to about 30%, based on the combined solids weight of the plurality of fibers and the at least partially cured strengthening resin.

The fibrous composite product can include the plurality of fibers in an amount of about 40%, about 45%, about 50%, about 55%, or about 60% to about 65%, about 70%, about 75%, about 80%, about 85%, about 90%, or about 95%, based on the combined solids weight of the plurality of fibers and the at least partially cured strengthening resin. For example, the fibrous composite product can include the plurality of fibers in an amount of about 50% to about 95%, about 50% to about 90%, about 50% to about 85%, about 50% to about 80%, about 50% to about 75%, about 50% to about 70%, about 60% to about 95%, about 60% to about 90%, about 60% to about 85%, about 60% to about 80%, about 60% to about 75%, about 65% to about 90%, about 65% to about 85%, about 65% to about 80%, about 65% to about 75%, about 70% to about 95%, about 70% to about 90%, about 70% to about 85%, or about 70% to about 80%, based on the combined solids weight of the plurality of fibers and the at least partially cured strengthening resin. In some specific examples, the fibrous composite product can include the plurality of fibers in an amount of about 60% to about 90% or about 70% to about 85%, based on the combined solids weight of the plurality of fibers and the at least partially cured strengthening resin.

The fibrous composite product can have a thickness of about 0.25 mm (10 mils), about 0.63 mm (25 mils), about 0.76 mm (30 mils), about 1.3 mm (50 mils), or about 1.9 mm (75 mils) to about 6.4 mm (250 mils), about 12.7 mm (500 mils), about 19 mm (750 mils), or about 25.4 mm (1,000 mils). For example, the fibrous composite product can have a thickness of about 0.5 mm (20 mils), about 1 mm (39 mils) about, or about 2 mm (79 mils). In another example, the fibrous composite product can have a thickness of about 0.5 mm (20 mils) to about 1.3 mm (50 mils), about 0.6 mm (25 mils) to about 1.1 mm (45 mils), or about 0.8 mm (30 mils) to about 1 mm (40 mils).

The crosslinked resin can be present in the strengthening resin in an amount of about 0.1%, about 0.5%, about 0.8%, or about 1% to about 2%, about 3%, about 4%, about 5%, about 6%, about 7%, about 8%, about 9%, about 10%, about 15%, about 20%, or about 25%, based on the combined solids weight of the crosslinked resin and the aldehyde-based resin. For example, the crosslinked resin can be present in the strengthening resin in an amount of about 0.1% to about 25%, about 0.5% to about 15%, about 0.5% to about 10%, about 1% to about 10%, about 1% to about 5%, about 2% to about 4%, or about 2.5% to about 3.5%, based on the combined solids weight of the crosslinked resin and the aldehyde-based resin.

The aldehyde-based resin can be present in the strengthening resin in an amount of about 40%, about 45%, about 50%, or about 55% to about 60%, about 70%, about 80%, about 85%, about 90%, about 91%, about 92%, about 93%, about 94%, about 95%, about 96%, or about 97%, about 98%, about 99%, or about 99.5%, based on the combined solids weight of the crosslinked resin and the aldehyde-based resin. For example, the aldehyde-based resin can be present in the strengthening resin in an amount of about 40% to about 99%, about 50% to about 98%, about 60% to about 98%, about 70% to about 98%, about 80% to about 98%, about 90% to about 98%, about 95% to about 98%, about 97% to about 98%, about 90% to about 99%, about 95% to about 99%, about 97% to about 99%, about 98% to about 99%, or about 98% to about 99.5%, based on the combined solids weight of the crosslinked resin and the aldehyde-based resin.

The fibrous composite products described herein can be or include one or more strengthening crosslinked resins that can have increased levels of cationic charge from enhanced azetidinium ion content (greater charge density), ability to control the amount of resin crosslinking, additional functionality, optimized or maximized molecular weights, high solids contents, and/or lower concentrations of epichlorohydrin byproducts, such as 1,3-dichloro-2-propanol (1,3-DCP or "DCP") or 3-chloropropane-1,2-diol (3-CPD or "CPD"). In some examples, the resin synthesis can include two separate and controllable steps. The first step can be used to make an intermediate molecular weight, crosslinked prepolymer, prepared upon reacting one or more polyamines or polyamidoamines with a functionally symmetric crosslinker. Unlike the function of the asymmetric crosslinker epichlorohydrin, the symmetric crosslinkers can utilize the same moiety for reaction with both prepolymer secondary amine groups to effect crosslinking. If desired, monofunctional groups can be used before, after, and/or during the crosslinking step to impart additional functionality to a prepolymer without the crosslinking function. The second step can be used to impart cationic functionality via one or more epihalohydrins, such as epichlorohydrin, with or without further crosslinking of the symmetrically crosslinked polymer. The epihalohydrin can impart cationic functionality without any crosslinking function, if used in a reduced amount to maximize azetidinium ion formation and minimize crosslinking mechanisms on the polymer.

Polyamine Prepolymer

One or more polyamines (polyamine prepolymers) can be used as a precursor to make the strengthening resins discussed and described herein. The polyamine prepolymer can include primary and/or secondary amine moieties that can be linked with at least one spacer. By way of example, the polyamine, which can be referred to herein as a polyamine prepolymer, can have the chemical formula (A): $H_2N-[RNH]_w-H$, where R can be a substituted or unsubstituted organic diyl group, and w can be 1 to about 10,000. In some examples, w can be 1 to about 5,000, 1 to about 3,000, 1 to about 1,000, 1 to about 100, or 1 to about 10. The organic diyl group R can be or include substituted or unsubstituted groups, linear or branched groups, acyclic or cyclic groups, and/or monomeric or polymeric units. The organic diyl group R can be or include one or more alkyls, hydroxyalkyls, amines, amides, aryls, heteroaryls, cycloalkyls, or derivatives thereof. A hydroxyalkyl group can include one or more hydroxyl (OH) moieties substituted on an alkyl moiety.

In some examples, the organic diyl group R of chemical formula (A) can be or include an alkyl moiety that can be linear or branched. The organic diyl group R can also be a cycloalkyl, that is, a cyclic hydrocarbon moiety having from 1 to about 25 carbon atoms. For example, the organic diyl group R can have from 1 to 25, from 1 to 20, from 1 to 15, from 1 to 12, from 1 to 10, from 1 to 8, from 1 to 6, or from 1 to 4 carbon atoms. In another example, the organic diyl group R can have from 2 to 10, 2 to 8, 2 to 6, or 2 to 4 carbon atoms. In some examples, R can be a $C_1$ moiety, a $C_2$ moiety, a $C_3$ moiety, a $C_4$ moiety, a $C_5$ moiety, a $C_6$ moiety, a $C_7$ moiety, a $C_8$ moiety, a $C_9$ moiety, a $C_{10}$ moiety, a $C_{11}$ moiety, a $C_{12}$ moiety, a $C_{13}$ moiety, a $C_{14}$ moiety, a $C_{15}$ moiety, a $C_{16}$ moiety, a $C_{17}$ moiety, a $C_{18}$ moiety, a $C_{19}$ moiety, a $C_{20}$ moiety, a $C_{21}$ moiety, a $C_{22}$ moiety, a $C_{23}$ moiety, a $C_{24}$ moiety, a $C_{25}$ moiety, a $C_{26}$ moiety, a $C_{27}$ moiety, a $C_{28}$ moiety, a $C_{29}$ moiety, a $C_{30}$ moiety.

In the polyamine prepolymer having the chemical formula (A), the organic diyl group R can be a poly-primary amine, such as a polyvinyl amine or a polyvinyl amine copolymer. Examples of a poly-primary amine that can constitute the organic diyl group R in chemical formula (A) can include, but are not limited to, one or more amines having the chemical formula $-[CH_2CH(NH_2)]_n-$, as well as copolymers with olefins and other unsaturated moieties, where n can be 1 to about 25. For example, n can be 1 to about 20; 1 to about 15; 1 to about 12; 1 to about 10; or 1 to about 5. In some examples, n can be 1, 2, 3, 4, 5, 6, 7, 8, 9, 10, 11, 12, 13, 14, 15, 16, 17, 18, 19, 20, 21, 22, 23, 24, or 25.

Suitable polyamines (polyamine prepolymers) that can be used to prepare the crosslinked resins discussed and described herein can include, but are not limited to, polyalkylene polyamines, such as polyethylenepolyamines including diethylenetriamine (DETA), triethylenetetramine (TETA), aminoethyl piperazine, tetraethylenepentamine, pentaethylenehexamine, N-(2-aminoethyl)piperazine, N,N'-bis(2-aminoethyl)-ethylenediamine, diaminoethyl triaminoethylamine, piperazinethyl triethylenetetramine, or any mixture thereof. Other polyamines that can be used to prepare the crosslinked resins can include, but are not limited to, ethylene diamine, polyamidoamines, e.g., low molecular weight polyamidoamines, polyvinylamines, polyethyleneimine (PEI), copolymers of vinyl amine with other unsaturated co-polymerizable monomers such as vinyl acetate and vinyl alcohol, or any mixture thereof.

In some examples related to the polyamine prepolymer having the chemical formula (A), w can be a number range corresponding to the polyamine prepolymer weight average molecular weight (Mw) can be about 2,000 to about 1,000,000. For example, the Mw of polyamine prepolymer having the chemical formula (A) can be about 5,000 to about 750,000; about 7,500 to about 500,000; about 10,000 to about 200,000; about 20,000 to about 150,000; or about 30,000 to about 100,000.

As used herein, the number average molecular weight ($M_n$) is the statistical average molecular weight of all the polymer chains in the polymers, prepolymers, or resins discussed and described herein. The weight average molecular weight ($M_w$) takes into account the molecular weight of a chain in determining contributions to the molecular weight average. The $M_n$ and the $M_w$ can be measured using gel permeation chromatography ("GPC"), also known as size exclusion chromatography ("SEC"). This technique utilizes an instrument containing columns packed with porous beads, an elution solvent, and detector in order to separate polymer molecules of different sizes, and is well known to those skilled in the art.

Polyamidoamine Prepolymer

Other suitable polyamines can include polyamidoamines (polyamidoamine prepolymers) that can also be used as precursors to make the strengthening resins discussed and described herein. The polyamidoamine prepolymers can be made by the reaction of one or more polyalkylene polyamines having at least two primary amine groups and at least one secondary amine group with a dicarboxylic acid, in a process to form a long chain polyamide containing the recurring groups. In some examples, the polyamidoamine prepolymer can have the following chemical formula (B):

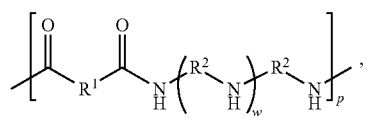

(B)

where $R^1$ can be $(CH_2)_m$, where m can be 1, 2, 3, 4, or 5; $R^2$ can be $(CH_2)$, where n can be 2, 3, or 4; w can be 1, 2, or 3; and p can be 1 to about 10,000. In some examples, p can be a number that corresponds to the $M_w$ of the polyamidoamine prepolymer that can be about 2,000 to about 1,000,000. For example, the $M_w$ of the polyamidoamine prepolymer can be about 5,000 to about 100,000; about 7,500 to about 80,000; about 10,000 to about 60,000; about 20,000 to about 55,000; about 25,000 to about 50,000; or about 30,000 to about 50,000.

In some examples, each $R^1$ and $R^2$ can independently be a substituted or unsubstituted organic diyl group and each organic diyl group can independently be a $C_1$-$C_5$ diyl group. For example, each organic diyl group can independently be methanediyl ($-CH_2-$), ethanediyl ($-CH_2CH_2-$), propanediyl ($-CH_2CH_2CH_2-$), butanediyl ($-CH_2(CH_2)_2CH_2-$), pentanediyl ($-CH_2(CH_2)_3CH_2-$), isomers thereof, halide-substituted derivatives thereof, or alkyl-substituted derivatives thereof.

In some examples, the polyamidoamine prepolymer can have the following chemical formula (C):

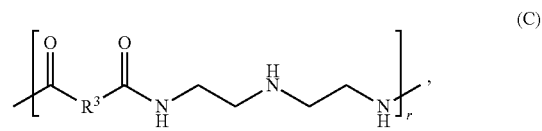

(C)

where $R^3$ can be $(CH_2)_q$, where q can be 1 to 40; and r can be 1 to about 10,000. In some examples of the polyamidoamine prepolymer having the chemical formula (C), $R^3$ can be $(CH_2)_q$, where q can be 1 to about 40, 1 to about 35, 1 to about 30, 1 to about 25, 1 to about 20, 1 to about 15, 1 to about 12, 1 to about 10, 1 to about 8, or 1 to about 6. In other examples, $R^3$ can be a substituted or unsubstituted organic diyl group. The diyl group $R^3$ can be a $C_1$-$C_5$ diyl group. For example, the diyl group $R^3$ can be methanediyl ($-CH_2-$), ethanediyl ($-CH_2CH_2-$), propanediyl ($-CH_2CH_2CH_2-$), butanediyl ($-CH_2(CH_2)_2CH_2-$), pentanediyl ($-CH_2(CH_2)_3CH_2-$), isomers thereof, halide-substituted derivatives thereof, or alkyl-substituted derivatives thereof.

In some examples, r can be a number that corresponds to the $M_w$ of the polyamidoamine prepolymer, for example, but not limited to, a $M_w$ of about 2,000 to about 1,000,000. The $M_w$ of the polyamidoamine prepolymer having the chemical formula (C) can be about 2,000, about 5,000, about 10,000, about 15,000, about 20,000, about 25,000, or about 30,000 to about 32,000, about 35,000, about 40,000, about 45,000, about 50,000, about 55,000, about 60,000, about 80,000, about 100,000, about 150,000, about 200,000, about 250,000, or greater. For example, the $M_w$ of the polyamidoamine prepolymer having the chemical formula (C) can be about 5,000 to about 100,000; about 7,500 to about 80,000; about 10,000 to about 60,000; about 20,000 to about 55,000; about 25,000 to about 50,000; about 30,000 to about 50,000; about 35,000 to about 50,000; or about 40,000 to about 50,000.

In other examples, the polyamidoamine prepolymer can have the chemical formula (D):

-[—NH($C_nH_{2n}$—NH)$_p$—CO—$(CH_2)_m$—CO—]-     (D), where n can be 1 to 8; p can be 2 to 5; and m can be 0 to 40. The $M_w$ of the polyamidoamine prepolymer having chemical formula (D) can be the same or similar to the weight average molecular weights of the compounds having chemical formulas (B) and (C). For example, the $M_w$ of the polyamidoamine prepolymer having chemical formula (D) can be about 2,000 to about 1,000,000. The $M_w$ can be about 5,000 to about 100,000; about 7,500 to about 80,000; about 10,000 to about 60,000; about 20,000 to about 55,000; about 25,000 to about 50,000; or about 30,000 to about 50,000.

Suitable polyamidoamine prepolymers can be prepared by reacting one or more dicarboxylic acids (diacid), or a corresponding dicarboxylic acid halide or diester thereof, with one or more polyamines such as a polyalkylene polyamine. Suitable polyamines include those polyamines (polyamine prepolymers) discussed and described herein that can be used as precursors for the crosslinked resin. For example, the polyamidoamine can be made by reacting one or more polyalkylene polyamines, such as polyethylenepolyamines including, ethylenediamine, DETA, TETA, aminoethyl piperazine, tetraethylenepentamine, pentaethylenehexamine, N-(2-aminoethyl)piperazine, N,N'-bis(2-aminoethyl)-ethylenediamine, diaminoethyl triaminoethylamine, piperazinethyl triethylenetetramine, or derivatives thereof, with one or more polycarboxylic acids such as succinic, glutaric, 2-methylsuccinic, adipic, pimelic, suberic, azelaic, sebacic, undecanedioic, dodecandioic, 2-methylglutaric, 3,3-dimethylglutaric and tricarboxypentanes such as 4-carboxypimelic; alicyclic saturated acids such as 1,2-cyclohexanedicarboxylic, 1-3-cyclohexanedicarboxylic, 1,4-cyclohexanedicarboxylic and 1-3-cyclopentanedicarboxylic; unsaturated aliphatic acids such as maleic, fumaric, itaconic, citraconic, mesaconic, aconitic and hexane-3-diotic; unsaturated alicyclic acids such as 1,4-cyclohexenedicarboxylic; aromatic acids such as phthalic, isophtalic, terephthalic, 2,3-naphthalenedicarboxylic, benzene-1,4-diacetic, and heteroaliphatic acids such as diglycolic, thiodiglycolic, dithiodiglycolic, iminodiacetic and methyliminodiacetic. Diacids and their related diesters of the formula $RO_2C(CH_2)_nCO_2R$ (where n can be 1 to 10, and R can be a H, a methyl, or an ethyl), and mixtures thereof can also be used. In some examples, adipic acid can be used to make or otherwise prepare one or more polyamidoamines.

Symmetric Crosslinker

Generally, the secondary amines of the polyamine can be reacted with one or more symmetric crosslinkers. The symmetric crosslinker can be a functionally symmetric crosslinker. The symmetric crosslinker, when reacted with the secondary amines of the polyamine can provide a bridging moiety. As such, the polyamine can be at least partially crosslinked with a bridging moiety derived from a functionally symmetric crosslinker. Functionally symmetric crosslinkers can include or provide the same moiety for reaction with both secondary amine groups of the polyamine to effect crosslinking. This reaction can provide for a greater degree of control over the crosslinking process. This reaction can also provide an intermediate crosslinked prepolymer with a greater molecular weight than the starting prepolymer. The viscosity end-point and thus the molecular weight of the intermediate crosslinked prepolymer can be pre-determined and controlled simply by the amount of symmetric crosslinker employed. The crosslinking reaction can proceed to an end-point as the crosslinker is consumed and stop when consumption of crosslinker is complete. A decreased and measureable amount of secondary amine functionality can remain available for further functionalization.

In this crosslinking step, the polyamine can be reacted with a deficiency of the symmetric crosslinker, based on the total amount of secondary amines available for crosslinking, to provide a partially crosslinked polyamine. Thus, the partially crosslinked polyamine can have a greater molecular weight than the polyamine, even though the partially crosslinked polyamine can be an intermediate in the process and can retain a portion of the secondary amine groups present in the polyamine prepolymer. In some examples, the partially crosslinked polyamine can retain a majority of the secondary amine groups present in the polyamine, because less than 50% of the stoichiometric amount of the symmetric crosslinker can be used.

Based on the polyamine or polyamine prepolymer repeating unit having a single secondary amine subject to reaction, and the symmetric crosslinker having two reactive moieties, a stoichiometric reaction of polyamine to crosslinker requires a 2:1 molar ratio, and practically, a 2:1 or higher molar ratio of polyamine to crosslinker can be utilized. The symmetric crosslinker to polyamine molar ratios can be selected to provide more than 0%, but less than 50%, less than 45%, less than 40%, less than 35%, less than 30%, less than 25%, less than 20%, less than 15%, less than 10%, less than 5%, less than 4%, less than 3%, less than 2%, less than 1%, less than 0.75%, or less than 0.5% of the stoichiometric ratio of crosslinker to prepolymer. These values reflect the combined molar amounts when using more than one symmetric crosslinker.

Examples of symmetric crosslinkers can be or include, but are not limited to, a diacrylate, a bis(acrylamide), a bis(methacrylamide), a diepoxide, a polyazetidinium compound, a diisocyanate, a 1,3-dialkyldiazetidine-2,4-dione, a dianhydride, a diacyl halide, a dienone, a dialkyl halide, a dialdehyde, or any mixture thereof. By way of example, useful symmetric crosslinkers can be or include one of the following:

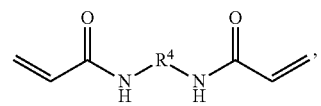

where $R^4$ can be $(CH_2)_t$ and t can be 1, 2, or 3;

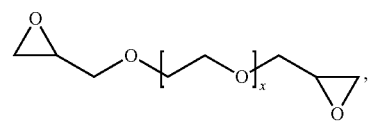

where x can be 1 to about 100;

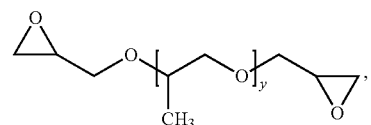

where y can be 1 to about 100;

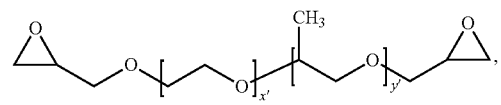

where x'+y' can be 1 to about 100; and/or

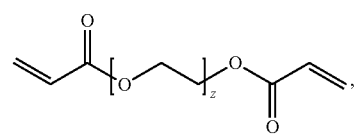

where z can be 1 to about 100; or any mixture thereof.

Illustrative symmetric crosslinkers can be or include, but are not limited to, N,N'-methylenebisacrylamide (MBA), N,N'-methylenebismethacrylamide (MBMA), a poly(alkylene glycol) diglycidyl ether, a poly(alkylene glycol) diacrylate, one or more polyazetidinium compounds, isomers thereof, alkylated derivatives thereof, salts thereof, or any mixture thereof. As such, in some examples the bridging moiety that can at least partially crosslink the polyamine can be derived from N,N'-methylenebisacrylamide (MBA), N,N'-methylenebismethacrylamide (MBMA), a poly(alkylene glycol) diglycidyl ether, a poly(alkylene glycol) diacrylate, one or more polyazetidinium compounds, isomers thereof, alkylated derivatives thereof, salts thereof, or any mixture thereof. Illustrative poly(alkylene glycol) diglycidyl ethers can include, but are not limited to, poly(ethyleneglycol) diglycidyl ether (PEG-DGE), poly(propyleneglycol) diglycidyl ether (PPG-DGE), or a mixture thereof. Illustrative poly(alkylene glycol) diacrylates can include, but are not limited to, poly(ethyleneglycol) diacrylate (PEG-DA), poly(propyleneglycol) diacrylate (PPG-DA), or a mixture thereof.

The diisocyanate can be unblocked or blocked. Illustrative unblocked diisocyanates can include, but are not limited to, 4,4'-methylene diphenyl diisocyanate (methylene diphenyl diisocyanate, MDI); toluene-2,4-diisocyanate (toluene diisocyanate, TDI); 1,6-hexane diisocyanate (hexamethylene diisocyanate, HDI); 5-isocyanato-1-(isocyanatomethyl)-1,3,3-trimethyl-cyclohexane (isophorone diisocyanate, IPDI), or any mixture thereof. Illustrative blocked diisocyanates can include, but are not limited to, bis-caprolactam blocked 4,4'-methylene diphenyl diisocyanate; 4,4'-methylene diphenyl diisocyanate bis(2-buanone oxime) adduct, bis-(3,5-dimethylpyrazole) blocked 4,4'-methylene diphenyl diisocyanate, or any mixture thereof. Commercially available blocked diisocyanates can include, but are not limited to, the TRIXENE®. BI products available from Baxenden Chemicals such as TRIXENE® BI 7641, 7642, 7674, 7675, 7950, 7951, 7960, 7961, 7963, and 7982, and the RUCO-Guard products available from Rudolf Group such as RUCO-Guard XCR, XTN, FX 8011, FX 8021, NET, TIE, and WEB.

Illustrative 1,3-dialkyldiazetidine-2,4-diones can include, but are not limited to, 1,3-diazetidine-2,4-dione; 1,3-dimethyl-1,3-diazetidine-2,4-dione; 1,3-diethyl-1,3-diazetidine-2,4-dione; 1,3-Diphenyl-1,3-diazetidine-2,4-dione; or any mixture thereof. Illustrative dianhydrides can include, but are not limited to, pyromellitic dianhydride; ethylene glycol bis(trimellitic anhydride); 4,4'-bisphenol A dianhydride, or any mixture thereof. Illustrative diacyl halides can include, but are not limited to, oxalyl chloride, oxalyl bromide, succinyl chloride, benzene-1,2-dicarbonyl dichloride, benzene-1,2-dicarbonyl bromide, phthaloyl chloride, or any mixture thereof. Illustrative dienones can include, but are not limited to, 1,7-octadiene-3,6-dione; bis(2-propen-1-one)-(1,4-benzene), or any mixture thereof. Illustrative dialkyl halides can include, but are not limited to, 1,2-dichloroethane; 1,2-dibromoethane; 1,2-diiodoethane; 1,2-dichloropropane; 1,2-dibromopropane; 1,3-dichloropropane; 1,3-dibromopropane; 1,3-diiodopropane; 1,4-bis(chloromethyl)benzene; 1,4-bis(bromomethyl)benzene, or any mixture thereof. Illustrative dialdehydes can include, but are not limited to, dialdehydes having the formula OHC(CH$_2$)$_n$CHO, where n is 0 to about 8, and mixtures thereof. Specific dialdehydes can include, but are not limited to, glyoxal, pyruvic aldehyde, succinaldehyde, glutaraldehyde, and 2-hydroxyadipaldehyde.

The symmetric crosslinker can be or include certain polymers or copolymers that have a type of functional moiety that can be reactive with secondary amines, i.e., that can function as the symmetric crosslinkers discussed and described herein. In some examples, these polymeric symmetric crosslinkers can be polymers or copolymers that have azetidinium functional groups. These polymeric symmetric crosslinkers can be, for example, copolymers of acrylates, methacrylates, alkenes, dienes, or derivatives thereof, with azetidinium-functionalized monomers. Illustrative azetidinium-functionalized monomers can include, but are not limited to, 1-isopropyl-3-(methacryloyloxy)-1-methylazetidinium chloride having the chemical formula (E), 1,1-diallyl-3-hydroxyazetidinium chloride having the chemical formula (F), as provided below, or a mixture thereof:

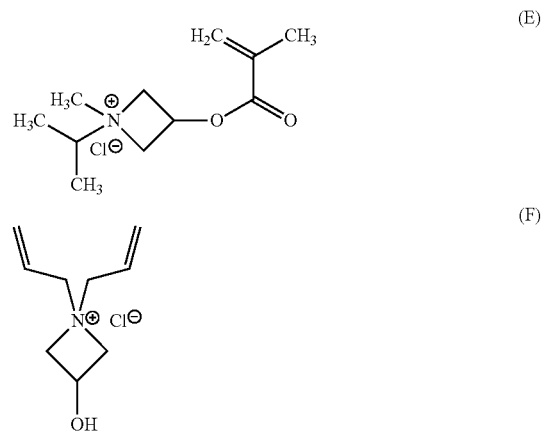

The polymeric symmetric crosslinkers can also be or include, copolymers of one or more acrylates, one or more methacrylates, one or more alkenes, one or more dienes, or any mixture thereof with other azetidinium-functionalized monomers. Other illustrative azetidinium-functionalized monomers can include, but are not limited to, compounds having the chemical formulas (G), (H), and (I):

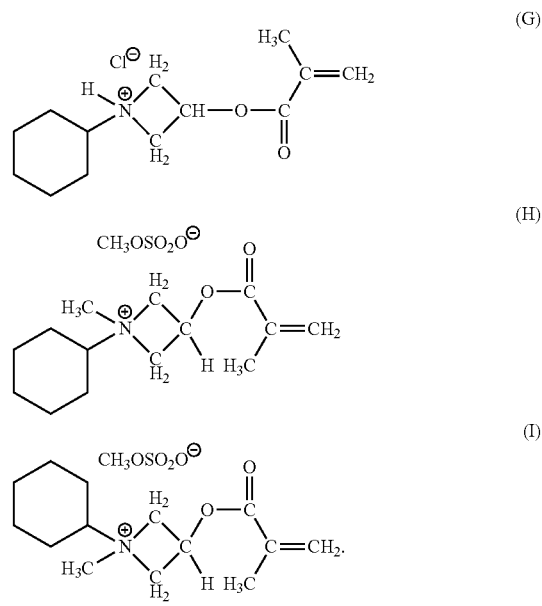

In other examples, the symmetric crosslinker can be or include a copolymer of an acrylate monomer, a methacrylate monomer, an alkene monomer, or a diene monomer, with an azetidinium-functionalized monomer that can be or include one or more of the compounds having the chemical formulas (E), (F), (G), (H), (I), derivatives thereof, isomers thereof, halides thereof (replacement of Cl with F, Br, or I), or any mixture thereof, where the fraction of azetidinium-functionalized monomer to the acrylate monomer, the methacrylate monomer, the alkene monomer, or the diene monomer in the copolymer can be about 0.1% to about 12%. In some examples, the fraction of azetidinium-functionalized monomer to the acrylate monomer, the methacrylate monomer, the alkene monomer, or the diene monomer in the copolymer can be from about 0.2% to about 10%, about 0.5% to about 10%, about 0.5% to about 8%, about 0.75% to about 6%, or about 1% to about 5%. Examples of these types of symmetric crosslinker polymers and copolymers can be found in the following references: Y. Bogaert, E. Goethals, and E. Schacht, *Makromol. Chem.*, 182, 2687-2693 (1981); M. Coskun, H. Erten, K. Demirelli, and M. Ahmedzade, *Polym. Degrad. Stab.*, 69, 245-249 (2000); and U.S. Pat. No. 5,510,004.

The symmetric crosslinker can be or include a relatively lower azetidinium-functionalized polyamidoamine. That is, the polyamidoamine can have relatively lower azetidinium functionalization, which can be the reactive moiety in this type of symmetric crosslinker. In this aspect, the crosslinking function can be effected by the azetidinium moieties, which can react with secondary amines of the polyamidoamine prepolymer. Polyamidoamines that can be used to prepare the relatively lower azetidinium-functionalized polyamidoamines can have the same general structures and formulas that can be used for the preparation of the resin itself, such as the crosslinked polymer and/or resins having the chemical formulas (K), (L), (M), and (N) discussed and described herein.

An example of a relatively lower azetidinium-functionalized polyamidoamine suitable for use as a symmetric crosslinker can have the following chemical formula (J):

polyamidoamine as a functionally symmetric crosslinker. As the q/p ratio indicates, there can be a small fraction of azetidinium moieties as compared to acid and amine residues. Moreover, the polyamidoamine having the chemical formula (J) can also have the structure where the q/p ratio can be about 12 to about 500; about 14 to about 400; about 16 to about 300; about 18 to about 200; or about 20 to about 100. One type of relatively lower azetidinium-functionalized polyamidoamine can be provided in, for example, U.S. Pat. No. 6,277,242.

As illustrated by the molar ratios of the symmetric crosslinker to the prepolymer, generally, a relatively small fraction of the available secondary amine sites can be subject to crosslinking to form the branched or partially crosslinked polyamine. In addition to the molar ratios provided herein, for example, the symmetric crosslinker to polyamine molar ratios can be selected to provide about 0.01% to about 5% of the stoichiometric ratio of crosslinker to polyamine. In some examples, the symmetric crosslinker to polyamine molar ratios can provide about 0.1% to about 4%; about 0.2% to about 3.5%; about 0.3% to about 3%; about 0.4% to about 2.5%; about 0.5% to about 2%; or about 0.6% to about 1.5% of the stoichiometric ratio of crosslinker to polyamine. These values reflect the combined molar amounts when using more than one symmetric crosslinker.

In some examples, one or more polyamines and one or more symmetric crosslinkers can be combined and reacted to make, form, or otherwise produce a crosslinked

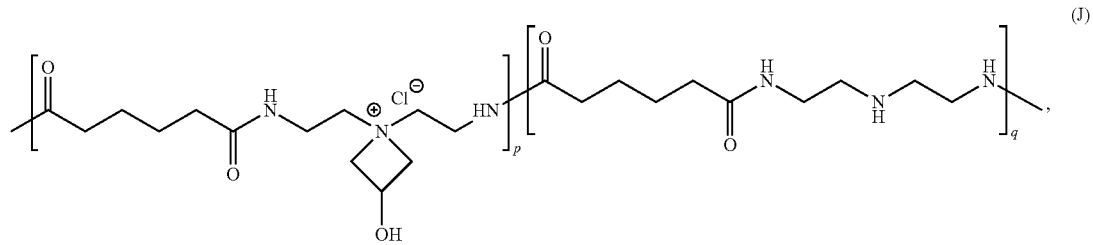

where p can be greater than or equal to 2 and the q/p ratio can be about 10 to about 1,000. The polyamidoamine having the chemical formula (J) can include at least two azetidinium moieties that function to crosslink, and that qualify the polyamine having secondary amines, such as a crosslinked polyamidoamine polymer. The crosslinked polyamine can be or include one or more crosslinked polymers having the following chemical formula (K):

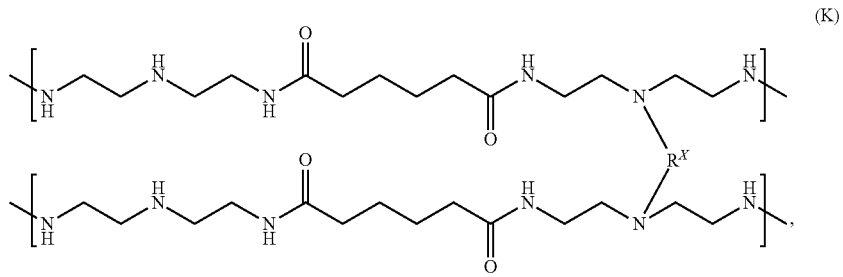

where the crosslinking moiety $R^X$ can be a symmetric crosslinking moiety made, derived, or otherwise produced from the symmetric crosslinker.

By way of example, using a polyamidoamine prepolymer derived from adipic acid and DETA, and crosslinking the polyamidoamine prepolymer using MBA, the crosslinked polymer (K) can have the crosslinking moiety $R^X$ with the chemical formula:

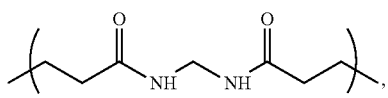

where the crosslinking moiety $R^X$ can be derived from MBA.

In other examples, the crosslinked polyamine having the chemical formula (K) can have the crosslinking moiety $R^X$ with the chemical formula:

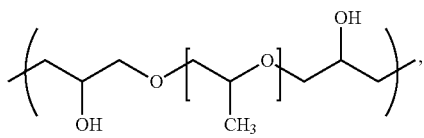

where the crosslinking moiety $R^X$ can be derived from PPG-DGE. It should be noted that these illustrations do not reflect the use of any mono-functional modifiers in addition to the symmetric crosslinker.

Mono-Functional Modifier

The secondary amine groups of the polyamine prepolymers can also be reacted with one or more mono-functional modifiers to impart any desired chemical functionality to the prepolymer. The mono-functional modifiers have a reactive group that can react with secondary or primary amines and a non-reactive part that can be cationic (to increase the cationic charge density), hydrophilic or hydrophobic (to adjust the interaction with non-ionic segments of the cellulose fibers). As desired, the polyamine prepolymer can be reacted with a deficiency of the mono-functional modifier containing one secondary amine-reactive moiety before, during, and/or after, the polyamine prepolymer is reacted with the symmetric crosslinker. Further, the reaction with a stoichiometric deficiency of a mono-functional modifier can also be carried out using any combination of reaction or addition before, during, and/or after, reaction with the symmetric crosslinker.

The mono-functional modifier can be or include a neutral or cationic acrylate compound, a neutral or cationic acrylamide compound, an acrylonitrile compound, a mono-epoxide compound, or any combination thereof. In some examples, the mono-functional modifier can be or include an alkyl acrylate, acrylamide, an alkyl acrylamide, a dialkyl acrylamide, acrylonitrile, a 2-alkyl oxirane, a 2-(allyloxyalkyl)oxirane, a hydroxyalkyl acrylate, an ω-(acryloyloxy)-alkyltrimethylammonium compound, an ω-(acrylamido)-alkyltrimethylammonium compound, or any mixture thereof. Exemplary mono-functional modifiers can have the following chemical formulas:

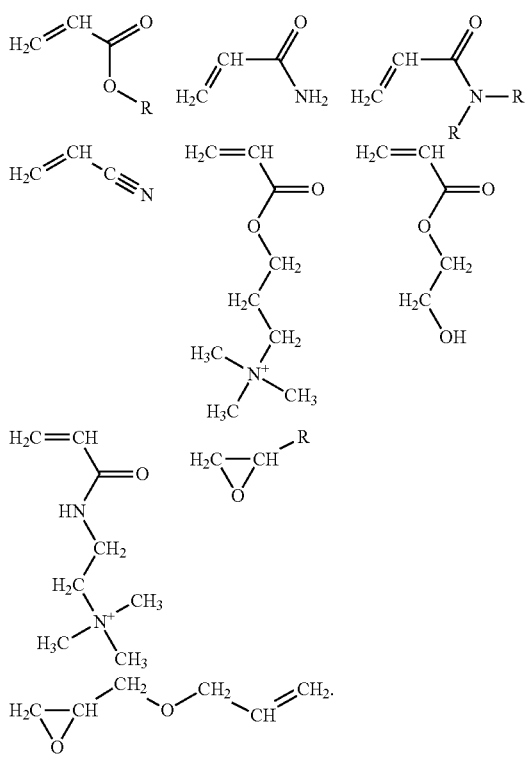

The mono-functional modifier can be or include at least one of: methyl acrylate; alkyl acrylate; acrylamide; N-methylacrylamide; N,N'-dimethylacrylamide; acrylonitrile; 2-methyloxirane; 2-ethyloxirane; 2-propyloxirane; 2-(allyloxymethyl)oxirane; 2-hydroxyethyl acrylate; 2-(2-hydroxyethoxy)ethyl acrylate; 2-(acryloyloxy)-N,N,N-trimethylethanaminium; 3-(acryloyloxy)-N,N,N-trimethylpropan-1-aminium; 2-acrylamido-N,N,N-trimethylethanaminium; 3-acrylamido-N,N,N-trimethylpropan-1-aminium; and 1-isopropyl-3-(methacryloyloxy)-1-methylazetidinium chloride. Depending, at least in part, on the structure of the modifier, upon reaction of these compounds with a secondary or primary amine, the portion that can be non-reactive toward the amine can impart cationic charge to assist in increasing the cationic charge density, can alter the hydrophilic or hydrophobic characteristics, for example to adjust the interaction with non-ionic segments of the cellulose fibers, and/or can affect other properties of the resulting intermediate crosslinked prepolymer.

Halohydrin-Functionalized Polymer and Intramolecular Cyclization

Generally, by separating into discrete or substantially discrete steps the reaction of the crosslinked polymer (e.g., the polyamine with the crosslinkers, such as the crosslinked polymer having the chemical formula (K)) from the reaction of the intermediate crosslinked prepolymer with the epichlorohydrin, the second reaction step requires less epichlorohydrin than conventional methods to reach the desired end-point. Further, this second reaction step can be effected under reaction conditions that favor optimized azetidinium group formation over further crosslinking. The asymmetric functionality of epichlorohydrin can be useful in this functionalization to allow a relatively facile reaction of the epoxy group with secondary amines to form a pendant chlorohydrin moiety, followed by an intramolecular cyclization of the pendant chlorohydrin to generate a cationic azetidinium functionality. This latter intramolecular cyclization can utilize heating of the halohydrin-functionalized polymer.

The second reaction step can be carried out using any epihalohydrin, such as epichlorohydrin, epibromohydrin, epiiodohydrin, or any mixture thereof. When reciting or discussing epichlorohydrin herein, including in structures or reaction schemes, it is understood that any epihalohydrin or any combination of the epihalohydrins can be used in the processes or compositions.

By way of example, the crosslinked polyamine having the chemical formula (K), that can be derived from adipic acid and DETA and crosslinked with MBA, can be reacted with one or more epihalohydrins to produce a halohydrin-functionalized polymer. When the epihalohydrin is epichlorohydrin, the halohydrin-functionalized polymer can be or include chlorohydrin-functionalized polymer. The halohydrin-functionalized polymer can be or include polymers having the following chemical formula (L).

0.9 moles to about 2.5 moles, about 1 mole to about 2 moles, about 1.1 moles to about 1.7 moles, about 1.2 moles to about 1.5 moles, or about 1.25 moles to about 1.45 moles.

Sufficient amounts of symmetric crosslinker and epihalohydrin can be employed such that the crosslinked resins prepared by the process can be free or substantially free of the original secondary amines in the polyamine or the polyamidoamine prepolymer. This result can be effected by using the molar amounts and ratios discussed and described herein, but the crosslinked resins described herein can be free or substantially free of secondary amine groups even when molar amounts and ratios outside those discussed and described herein are used. In some examples, the crosslinked resins can be free or substantially free of secondary amine groups and can have less than 10% of the original secondary amines in the polyamine or the polyamidoamine prepolymer. For example, the crosslinked resin can have less than 5%, less than 2%, less than 1%, less than 0.5%, less than 0.2%, less than 0.1%, less than 0.01%, less than 0.005%, or

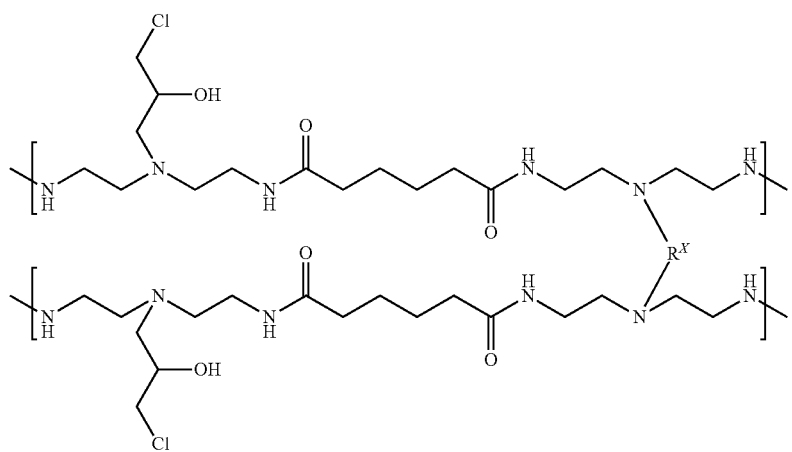

(L)

As before, the halohydrin-functionalized polymer having the chemical formula (L) does not reflect the use of any mono-functional modifiers in addition to the symmetric crosslinker.

The reaction of epihalohydrins such as epichlorohydrin can generally be tailored to consume a high percentage or the remaining secondary amine moieties in generating the halohydrin-functionalized polymer, in this aspect, a chlorohydrin-functionalized polymer. The formation of the halohydrin-functionalized polymer can be carried out using a range of epichlorohydrin molar ratios, but this reaction can generally be carried out using an excess of epichlorohydrin. In some examples, the stoichiometric reaction of epichlorohydrin with a secondary amine group can be a 1:1 molar ratio of epichlorohydrin with a secondary amine. In other examples, the moles of epichlorohydrin per mole of secondary amine combined, reacted or otherwise used to produce the halohydrin-functionalized polymer can be about 0.8 moles, about 0.9 moles, or about 1 mole to about 1.1 moles, about 1.2 moles, about 1.3 moles, about 1.4 moles, about 1.5 moles, about 1.6 moles, about 1.8 moles, about 2 moles, about 2.2 moles, or about 2.5 moles. For example, the halohydrin-functionalized polymer can be produced from a reaction of epichlorohydrin and the secondary amine group combined at a ratio of moles of epichlorohydrin per mole of secondary amine at about 0.8 moles to about 3 moles, about less than 0.001% of the original secondary amines in the polyamine or the polyamidoamine prepolymer.

The halohydrin-functionalized polymer (e.g., chlorohydrin-functionalized polymer) having the chemical formula (L) can be converted to an azetidinium functionalized crosslinked resin by subjecting the halohydrin-functionalized polymer to cyclization conditions to form azetidinium ions. This step can include heating the chlorohydrin-functionalized polymer. In contrast to the conventional method in which heating induces both crosslinking and cyclization, the crosslinking portion of the process described herein can already be complete when the cyclization is carried out, thereby affording greater process control and the ability to more closely tailor the desired properties of the resulting resin. Also in contrast to the conventional method, the process described herein can reduce and/or minimize the formation of DCP, CPD, and/or other epichlorohydrin byproducts remaining in the resin can be reduced or minimized.

In some examples, the concentration of DCP remaining in the strengthening resin at 25% solids (DCP @ 25%) can be less than 15,000 ppm. For example, the strengthening resin at 25% solids can be less than 14,000 ppm, less than 13,000 ppm, less than 12,000 ppm, less than 11,500 ppm, less than 11,000 ppm, less than 10,500 ppm, less than 10,000 ppm, less than 8,000 ppm, less than 6,000 ppm, less than 5,000 ppm.

The chlorohydrin-functionalized polymer having the chemical formula (L) can be subjected to conditions sufficient to intramolecularly cyclize the pendant chlorohydrin to impart azetidinium functionality during a cyclization step. The product resin can be or include azetidinium functionalized crosslinked resins having the below chemical formula (M).

The amount of the halohydrin groups cyclized to form azetidinium ions can be measured via titration with silver nitrate. More particularly, the total chlorine content for a first sample of the crosslinked resin can be measured by refluxing in the presence of a hydroxide (e.g., potassium hydroxide or sodium hydroxide) to convert all of the covalently-bound chlorines to chloride ions, neutralizing with nitric acid, and

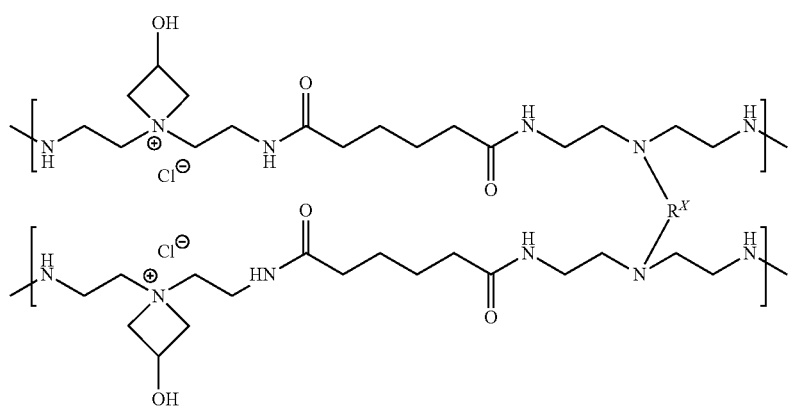

(M)

The azetidinium functionalized crosslinked resins having the chemical formula (M) can be generated by subjecting the halohydrin-functionalized polymers having the chemical formula (L) to cyclization conditions sufficient to convert the halohydrin groups to form azetidinium ions. In some examples, at least a portion of the halohydrin groups can be cyclized to form azetidinium ions. For example, at least 90%, at least 91%, at least 92%, at least 93%, at least 94%, at least 95%, at least 97%, at least 98%, at least 98.5%, at least 99%, at least 99.5%, at least 99.7%, at least 99.8%, or at least 99.9% of the halohydrin groups can be cyclized to form azetidinium ions. In other examples, greater than 90%, greater than 91%, greater than 92%, greater than 93%, greater than 94%, greater than 95%, greater than 96%, greater than 97%, greater than 98%, greater than 99%, greater than 99.3%, greater than 99.5%, greater than 99.7%, or greater than 99.9% of the halohydrin groups can be cyclized to form azetidinium ions.

titrating with a silver nitrate solution. The total chlorine content, therefore, can be the sum of covalently-bound chlorines and ionic chlorines. The amount of the ionic chloride can be measured on a second sample of the crosslinked resin, which does not involve refluxing in the presence of the hydroxide. The total amount of chlorine minus the amount of ionic chloride can be the amount of chlorine (halohydrin groups) that can be cyclized to form azetidinium ions.

Any of the crosslinked polymers or resins, as discussed and described herein, including, but not limited to, the crosslinked polymers having the chemical formula (K), the halohydrin-functionalized polymers having the chemical formula (L), and the azetidinium functionalized crosslinked resins having the chemical formula (M) can be converted to a halohydrin-crosslinked, symmetric-crosslinked resin. The halohydrin-crosslinked, symmetric-crosslinked resin can have the chemical formula (N):

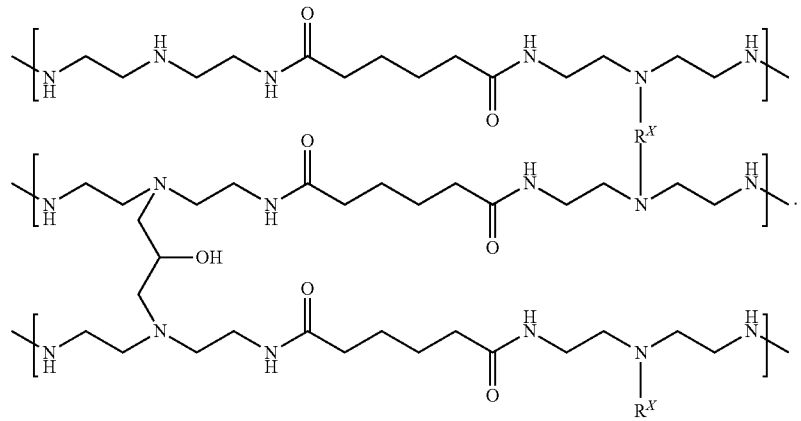

(N)

Additional steps in the preparation of the crosslinked resin can be used, for example, to adjust the solids content of the crosslinked resin, beyond those described in detail above. For example, the crosslinked resin can be generated by converting the halohydrin-functionalized polymer to an azetidinium functionalized polymer. Following this step, the crosslinked resin composition can be adjusted by pH such that the pH value of the resin can be about 2 to about 4.5, about 2.2 to about 4.2, about 2.5 to about 4, or about 2.7 to about 3.7. This pH adjustment step can also be followed by the step of adjusting the solids content, by weight, of the resin composition from about 10% to about 50% to form the strengthening resin. For example, the solids content of the resin can be adjusted from about 15% to about 40% or about 20% to about 30% to form the crosslinked resin. In some examples, the crosslinked resin can have a solids content of about 25%.

The solids weight, solids concentration, or solids content of the strengthening resin, the aldehyde-based resin, the crosslinked resin, other dispersions, suspensions, solutions, or other solid/liquid mixtures, as understood by those skilled in the art, can be measured by determining the weight loss upon heating a small sample to a temperature sufficient to remove the liquid therefrom and determining the difference in the weight of the sample. For example, to determine the solids content of the strengthening resin, the aldehyde-based resin, or the crosslinked resin, a small sample, e.g., about 5 grams to about 8 grams, can be heated to a suitable temperature, e.g., about 105° C., and a time sufficient to remove the liquid therefrom. By measuring the weight of the sample before and after heating, the percent solids in the sample can be directly calculated or otherwise estimated.

Suitable methods for preparing crosslinked resins and/or various polyamide-epihalohydrin (PAE) resins can include those discussed and described in U.S. Pat. Nos. 2,926,116; 3,058,873; 3,772,076; 5,338,807; 5,567,798; 5,585,456; 8,246,781, 9,045,862; U.S. Publication Nos.: 2012/0064323; 2014/0020858; 2014/0166223; 2015/0211182; 2015/0211183; 2015/0259858; 2015/0259859; 2016/0115315; EP Patent No.: EP 0488767; Canadian Publication No.: CA 979,579; and GB Publication No.: GB 865,727(A). Many commercially available PAE resins are known and can be contained in the strengthening resins. Suitable commercially available PAE resins can include, but are not limited to, AMRES® resins available from Georgia-Pacific Chemicals LLC, KYMENE® resins available from Ashland-Hercules, and FENNOSTRENGTH® resins available from Kemira.

The crosslinked polymers or resins having any of the chemical formulas (L), (M), and/or (N) can have a charge density that can be enhanced over that of conventional resins. For example, the crosslinked resin can have a charge density of about 2 mEq/g of solids to about 4 mEq/g of solids. For example, the crosslinked resin can have a charge density of about 2.25 mEq/g of solids to about 3.5 mEq/g of solids; about 2.3 mEq/g of solids to about 3.35 mEq/g of solids; about 2.4 mEq/g of solids to about 3.2 mEq/g of solids; or about 2.5 mEq/g of solids to about 3.0 mEq/g of solids. The charge density of the crosslinked resin can be measured via streaming electrode potential using a titrator or a particle charge detector (PCD), such as a Mütek PCD.

The crosslinked resins, including the crosslinked resins having the chemical formulas (M) or (N), can have an azetidinium ratio, or "Azet" ratio. The Azet ratio is the ratio of the polymer segments containing azetidinium ion to the total number of polymer segments. A single polymer segment is defined by a condensation moiety derived from one diacid molecule (for example, adipic acid) and one triamine molecule (for example, diethylenetriamine or DETA), as illustrated below.

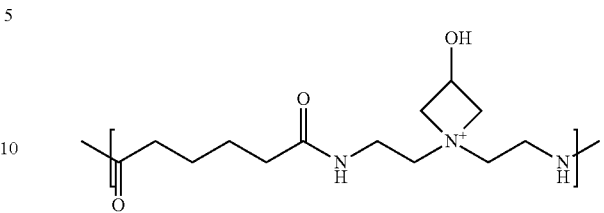

The azetidinium ratio can be determined by quantitative (inverse gated heteronuclear decoupled) $^{13}C$ NMR spectroscopy, using a relaxation time of 22.5 seconds, spectral width of 15 kHz (240 ppm), and a scan count of 320 scans to 1,024 scans. Measurements can be made by integration of the methylene peaks in the azetidinium ion and the inner carbons of the adipic acid portion of the polymer. The adipic acid portion can be assigned to be the total number of polymer segments. Thus when the polymer can be prepared using adipic acid, the azetidinium ratio can be determined according to the formula: Azetidinium Ratio (Azet Ratio)= A(azet)/A(adip), where, A(azet) is the integrated area of methylenes from azetidinium ions, and A(adip) is the integrated area of methylenes from the adipic moiety (total polymer segments). This method can be adapted to any resin discussed and described herein. Thus, for adipic acid based polymers, the azetidinium ion peak at 74 ppm and the backbone methylene peak at 25 ppm can both be integrated and the methylene peak at 25 ppm can be normalized to 1. For glutaric acid based polymers, the azetidinium ion peak at 74 ppm and the backbone methylene peak at 22 ppm can both be integrated and the methylene peak at 22 ppm can be normalized to 1.

As such, the crosslinked resins, including the crosslinked resins having the chemical formulas (M) or (N), can have an azetidinium ratio of about 0.4, about 0.5, about 0.6, or about 0.7 to about 0.8, about 0.9, about 1, about 1.1, about 1.2, about 1.3, about 1.4, or about 1.5. For example, the crosslinked resins can have an azetidinium ratio of about 0.4 to about 1.5, about 0.4 to about 1.3, about 0.4 to about 1.1, about 0.4 to about 1, about 0.5 to about 1.5, about 0.5 to about 1.3, about 0.5 to about 1.2, about 0.5 to about 1.1, about 0.5 to about 1, about 0.6 to about 1.5, about 0.6 to about 1.3, about 0.6 to about 1.1, about 0.6 to about 1, about 0.7 to about 1.5, about 0.7 to about 1.3, about 0.7 to about 1.1, about 0.7 to about 1, or about 0.7 to about 0.9.

The crosslinked resin can have a weight average molecular weight (Mw) of about $0.02 \times 10^6$, about $0.05 \times 10^6$, about $0.1 \times 10^6$, or about $0.5 \times 10^6$ to about $0.7 \times 10^6$, about $0.9 \times 10^6$, about $1 \times 10^6$, about $1.5 \times 10^6$, about $2 \times 10^6$, about $2.5 \times 10^6$, about $2.9 \times 10^6$, or about $3 \times 10^6$. For example, the crosslinked resin can have a Mw of about $0.02 \times 10^6$ to about $3.0 \times 10^6$, $0.05 \times 10^6$ to about $2.5 \times 10^6$, about $0.1 \times 10^6$ to about $2.0 \times 10^6$, about $0.5 \times 10^6$ to about $1.5 \times 10^6$, or about $1 \times 10^6$ to about $1.0 \times 10^6$. In other examples, the crosslinked resin can have a Mw of about $0.05 \times 10^6$ to about $1.7 \times 10^6$, about $0.6 \times 10^6$ to about $1.6 \times 10^6$, about $0.7 \times 10^6$ to about $1.5 \times 10^6$, about $0.8 \times 10^6$ to about $1.3 \times 10^6$, or about $0.9 \times 10^6$ to about $1.1 \times 10^6$. In one specific example, the crosslinked resin can have a Mw of about $0.02 \times 10^6$ to about $3.0 \times 10^6$.

The crosslinked resin can have an azetidinium equivalent weight, defined as the degree of polymerization multiplied by the Azet ratio, or (degree of polymerization)×(Azet). The crosslinked resin can have an azetidinium equivalent weight of about 1,600, about 1,800, or about 2,000 to about 2,100, about 2,500, about 2,700, about 2,900, about 3,000, about 3,200, about 3,500, about 3,800, or about 4,000. For example, the crosslinked resin can have an azetidinium equivalent weight of about 1,600 to about 3,800, about 1,800 to about 3,500, or about 2,000 to about 2,900.

Aldehyde-Based Resins and Other Resins

Illustrative aldehyde-based resins can be or include, but are not limited to, one or more urea-formaldehyde ("UF") resins, one or more phenol-formaldehyde ("PF") resins, one or more melamine-formaldehyde ("MF") resins, one or more resorcinol-formaldehyde ("RF") resins or any mixture thereof. The aldehyde-based resin can be or include combinations of amino-aldehyde copolymers that can include, for example, melamine-urea-formaldehyde ("MUF") resins, phenol-urea-formaldehyde ("PUF") resins, phenol-melamine-formaldehyde ("PMF") resins, phenol-resorcinol-formaldehyde ("PRF") resins, derivatives thereof, or any mixture thereof. In some examples, the aldehyde-based resin can be or include a copolymer produced from styrene-acrylic acid, acrylic acid, maleic acid, or any mixture thereof. For example, the aldehyde-based resin can be or include a combination of an amino-aldehyde copolymer and/or a phenol-aldehyde copolymer and a polyacrylic acid, for example, urea-formaldehyde-polyacrylic acid, melamine-formaldehyde-polyacrylic acid, phenol-formaldehyde-polyacrylic acid, or any mixture thereof In some examples, the aldehyde-based resin can be or include one or more UF resins. The UF resin can be prepared from urea and formaldehyde monomers and/or from UF precondensates. For example, any of the wide variety of procedures used for reacting urea and formaldehyde monomers to form a UF resin can be used, such as staged monomer addition, staged catalyst addition, pH control, or amine modification. The urea and formaldehyde monomers can be reacted in an aqueous solution under alkaline conditions.

Formaldehyde for making a suitable UF resin can be available in many forms. Formaldehyde suitable for making a UF resin can be available in many forms. The formaldehyde can be supplied as an aqueous solution, such as formalin. In some examples, the formalin can contain about 37 wt % to about 50 wt % of formaldehyde. Other forms of formaldehyde such as paraformaldehyde can also be used. Other aldehydes can be used in lieu of or in combination with formaldehyde. For example, suitable aldehydes that can be used in lieu of or in combination with formaldehyde can be or include, but are not limited to, aliphatic aldehydes such as acetaldehyde and propionaldehyde, aromatic aldehydes such as benzylaldehyde and furfural, glyoxal, crotonaldehyde, or any combination thereof.

Other aldehyde monomers can be used in lieu of or in combination with formaldehyde for making resins. The aldehyde monomers can include any suitable aldehyde or combination of aldehydes. The aldehyde monomers can include a variety of substituted and unsubstituted aldehyde compounds. Illustrative aldehyde compounds can include the so-called masked aldehydes or aldehyde equivalents, such as acetals or hemiacetals. Specific examples of suitable aldehyde compounds can include, but are not limited to, formaldehyde, acetaldehyde, propionaldehyde, butyraldehyde, furfuraldehyde, benzaldehyde, or any combination or mixture thereof. As used herein, the term "formaldehyde" can refer to formaldehyde, formaldehyde derivatives, other aldehydes, or combinations or mixtures thereof. In some examples, the aldehyde monomer can be formaldehyde.

Urea can be available in many forms that can be used to make the aldehyde-based resins. Solid urea, such as prill, and urea solutions, such as aqueous solutions, can be used. Various forms of urea or urea in combination with formaldehyde can be used to make the aldehyde-based resins. In some examples, urea prill and the combined urea-formaldehyde products can be used, such as urea-formaldehyde concentrate 85 (UFC 85). Other urea-formaldehyde concentrates, for example, that can be used to make the aldehyde-based resins include INSOL-U-25® and STA-FORM 60® urea-formaldehyde concentrates, that are commercially available from Georgia Pacific Chemicals LLC. One particularly useful class of UF resins for use in preparing the strengthening resins discussed and described herein can include those discussed and described in, for example, U.S. Pat. Nos. 5,362,842 and 5,389,716. The UF resins that can be used to prepare the strengthening resins discussed and described herein can include GP® 2928 UF resins and/or GP® 2980 UF resins, commercially available from Georgia Pacific Chemicals LLC. Other UF resins that can be used to prepare the strengthening resins discussed and described herein can include UF resins utilized for glass fiber mat applications, such as those sold by Hexion Specialty Chemicals and Arclin Company. Suitable phenol-formaldehyde resins and melamine-formaldehyde resins can include those sold by Georgia Pacific Resins, Inc. (e.g., GP®-2894 PF resin and GP®-4878 MF resin). These polymers can include reactive methylol groups which upon curing form methylene or ether linkages. Such methylol-containing adducts can include N,N'-dimethylol, dihydroxymethylolethylene; N,N'-bis(methoxymethyl), N,N'-dimethylolpropylene; 5,5-dimethyl-N,N'-dimethylolethylene; N,N'-dimethylolethylene.

The urea-formaldehyde resin can be made using a molar excess of formaldehyde. When synthesized, such resins contain a low level of residual "free" urea and a much larger amount of residual "free," i.e., unreacted, formaldehyde. Prior to any formaldehyde scavenging, the urea-formaldehyde resin can be characterized by a free formaldehyde content of about 0.2 wt % to about 18 wt % of the aqueous urea-formaldehyde resin. For example, the urea-formaldehyde resin can have a concentration of free formaldehyde of about 0.1 wt %, about 0.5 wt %, about 1 wt %, or about 2 wt % to about 6 wt %, about 12 wt %, or about 18 wt %, based on the total weight of the urea-formaldehyde resin.

The urea-formaldehyde resin can have a molar ratio of formaldehyde to urea (F:U) of about 0.3:1, about 0.9:1, or about 1.5:1 to about 3:1, about 4:1, about 5:1, or about 6:1. For example, the urea-formaldehyde resin can have a molar ratio of formaldehyde to urea from about 0.5:1 to about 0.1.2:1, about 1.3:1 to about 2:1, about 2:1 to about 3:1, about 1.1:1 to about 3:1, about 4:1 to about 5:1, or about 5:1 to about 6:1. In other examples, the urea-formaldehyde resin can have a molar ratio of formaldehyde to urea from about 0.7:1 to about 2.7:1, about 0.9:1 to about 1.3:1, about 1:1 to about 2.4:1, about 1.1:1 to about 2.6:1, or about 1.3:1 to about 2:1. In another example, the urea-formaldehyde resin can have a molar ratio of formaldehyde to urea from about 0.25:2.5 to about 1.5:2.5.

The urea-formaldehyde resin can have a weight average molecular weight of about 200, about 300, or about 400 to about 1,000, about 2,000, about 14,000, about 25,000, about 50,000, about 100,000 or about 500,000. In another example, the urea-formaldehyde resin can have a weight average molecular weight of about 250 to about 450, about 450 to about 550, about 550 to about 950, about 950 to about 1,500, about 1,500 to about 2,500, or about 2,500 to about 6,000. In another example, urea-formaldehyde resin can have a weight average molecular weight of about 175 to about 800, about 700 to about 3,330, about 1,100 to about 4,200, about 230 to about 550, about 425 to about 875, or about 475 to about 775. In other examples, urea-formaldehyde resin can have a weight average molecular weight of about 10,000 to about 100,000, about 12,000 to about 250,000, or about 14,000 to about 500,000.

The reaction can be conducted in an aqueous solution. The reaction can be conducted so that the resulting urea-formaldehyde resin has a solids content of at least about 20%, at least about 30%, at least about 35%, or at least about 45%, based on the weight of the UF resin solution. The solids content can be about 20%, about 30%, about 40%, about 45%, or about 50% to about 55%, about 60%, about 65%, about 70%, about 75%, or about 80%, based on the weight of the UF resin solution. For example, UF resin solutions can have a non-volatile material or solids content from about 40% and about 48%, about 40% and about 44%, about 45% and about 65%, or about 50% and about 60%, based on the weight of the UF resin solution.

The viscosity of the urea-formaldehyde resin can widely vary. For example, the viscosity of the urea-formaldehyde resin can be about 1 cP, about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the urea-formaldehyde resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the urea-formaldehyde resin can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C.

The viscosity of the various compositions discussed and described herein can be determined using a Brookfield viscometer at a temperature of about 25° C. For example, a Brookfield viscometer, Model DV-II+, with a small sample adapter (e.g., a 10 mL adapter) with, for example, a number 31 spindle, can be used. The small sample adapter can allow the sample to be cooled or heated by the chamber jacket to maintain the temperature of the sample surrounding the spindle at a temperature of about 25° C. The appropriate spindle, such as a number 31 spindle, can be used to maximize torque. The various compositions discussed and described herein can have any desired solids content when the viscosity is measured. For example, the various compositions can have a solids content of about 10%, about 15%, about 20%, about 25%, about 30%, or about 35% to about 40%, about 45%, about 50%, about 60%, about 70%, or about 80%, based on the weight of the composition, when the viscosity is measured at a temperature of about 25° C. In one example, the strengthening resin can have a solids content of about 10%, about 15%, about 20%, about 25%, about 30%, or about 35% to about 40%, about 45%, about 50%, about 60%, about 70%, or about 80%, based on the combined weight of the aldehyde-based resin and the cross-linked resin, when the viscosity is measured at a temperature of about 25° C.

The urea-formaldehyde resin can have pH of about 1, about 2, about 3, about 4, about 5, about 6, about 7 to about 8, about 9, about 10, about 11, about 12, or about 13. In another example, urea-formaldehyde resin can have a pH of about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

The UF resin can also include one or more additives such as ammonia, alkanolamines, or polyamines, such as an alkyl primary diamine, e.g., ethylenediamine (EDA). Other additives, such as melamine, ethylene ureas, primary amines, secondary amines, and tertiary amines, for example, dicyanodiamide, can also be incorporated into or otherwise included in the UF resin. Concentrations of these additives in the UF resin can be about 0.05% to about 20%, based on the weight of the UF resin solids. These types of additives can promote hydrolysis resistance, polymer flexibility, and/or lower formaldehyde emissions in the cured resin. Further urea additions for purposes of scavenging formaldehyde or as a diluent can also be used. The UF resins can also have a water dilutability of about 1:1 to about 100:1, about 5:1 to about 100:1, or about 10:1 to about 100:1.

The additives can be other monomers and/or polymers such as styrene acrylic acid or styrene acrylate, an adduct of styrene, maleic anhydride, and an acrylic acid or acrylate, or a mixture of a styrene acrylic acid or styrene-acrylate copolymer and a styrene-maleic anhydride copolymer. The additive can be added to the UF resin or can be formed in situ by mixing the styrene-maleic anhydride and an acrylate monomer with the UF resin.

The additive can be prepared by combining styrene, maleic anhydride, and an acrylate or acrylic acid in amounts to form a terpolymer. The amount of styrene can be about 50 wt % to about 85 wt %, about 60 wt % to about 80 wt %, or about 65 wt % to about 75 wt %, such as about 70 wt %. The amount of maleic anhydride can be about 15 wt % to about 50 wt %, about 15 wt % to about 40 wt %, or about 20 wt % to about 30 wt %, for example, about 25 wt %. The amount of an acrylate or acrylic acid can be about 1 wt % to about 20 wt %, about 2 wt % to about 12 wt %, or about 3 wt % to about 7 wt %, for example, about 5 wt %.

The constituents of the terpolymer can be dissolved in a suitable solution such as an aqueous solution of sodium hydroxide, ammonium hydroxide, potassium hydroxide, or any combination thereof. In one example, about 1 wt % to about 5 wt % of the terpolymer constituents can be dissolved in the aqueous solution. The solution can be heated from about 70° C. to about 90° C., and held until the terpolymer can be in solution. The solution can then be added to a urea-formaldehyde resin.

Alternatively the acrylic acid or acrylate can be combined with styrene maleic anhydride in situ with the urea-formaldehyde resin. The result can be a styrene maleic anhydride methylmethacrylate terpolymer. Any suitable acrylic acid or acrylate can be used such as methyl methacrylate, butyl acrylate, or methacrylate. In one example, the acrylate can be methyl methacrylate (MMA). Styrene-maleic anhydride (SMA) copolymers can be used. Suitable SMA copolymers can be as discussed and described in U.S. Pat. No. 5,914,365.

The additive can be about 0.1 wt % to about 10 wt % or about 0.5 wt % to about 5 wt % of the undiluted resin solids. The total concentration of non-volatile materials in the aqueous resin composition (predominantly UF resin and additive solids) can vary widely. The total solids concentration can be about 5 wt % to about 40 wt %, based on the total weight of the aqueous resin composition. For example, the total solids can be about 20 wt % to about 35 wt % or about 20 wt % to about 30 wt %, based on the total weight of the aqueous resin composition.

The crosslinked resins can include one or more polyamidoamine backbones at least partially crosslinked by one or more symmetric crosslinks and optionally crosslinked by one or more epihalohydrin crosslinks and/or optionally include azetidinium functional groups. Suitable methods for preparing such crosslinked resins can include those discussed and described in U.S. Publication Nos.: 2014/0020858 and 2014/0166223.

The fibrous composite products and other compositions can be employed with any fibers or fiber webs which can be formed into mats or other products in any suitable manner. As used herein, the terms "fiber", "fibers", "fibrous", "fiberglass", "fiber glass", "fiber web", and "glass fibers" refer to as materials that have an elongated morphology exhibiting an aspect ratio (length to thickness) of greater than 100, and generally greater than 500, such as, for example, about 1,000 or greater, about 5,000 or greater, or about 10,000 or greater.

The fibers or fiber webs can be or include natural fibers, synthetic fibers, inorganic fibers, organic fibers, or any mixture or combination thereof. Inorganic fibers can be or include, but are not limited to, glass fibers, mineral fibers, ceramic fibers, carbon fibers, graphite fibers, metal fibers, metal coated glass fibers, organic coated glass fibers, or asbestos fibers, or any mixture or combination thereof. Illustrative glass fibers can be or include, but are not limited to, A-type glass fibers, C-type glass fibers, E-type glass fibers, S-type glass fibers, ECR-type glass fibers, WUCS glass fibers, wool glass fibers, or any mixture thereof.

In one specific example, the fibers can be glass fibers that are wet use chopped strand ("WUCS") glass fibers. The WUCS glass fibers can be formed by conventional processes known in the art. The WUCS glass fibers can have a moisture content of about 5%, about 8%, or about 10% to about 20%, about 25%, or about 30%.

Organic fibers can be or include, but are not limited to, acrylic, aromatic polyamide, polyester, cellulosic including cellulose, polyolefin fibers, or any mixture thereof. The term "natural fibers," as used herein refers to plant fibers extracted from any part of a plant, including, but not limited to, the stem, seeds, leaves, roots, or phloem. Illustrative natural fibers can be or include, but are not limited to, cotton, jute, bamboo, ramie, bagasse, hemp, coir, linen, kenaf, sisal, flax, henequen, or any mixture thereof. Illustrative synthetic fibers can be or include, but are not limited to, synthetic polymers, such as polyester, polyamide, aramid, or any mixture thereof.

Prior to using the fibers to make a fiberglass product, the fibers can be allowed to age for a period of time. For example, the fibers can be aged for a period of a few hours to several weeks before being used to make a fiberglass product. For fiberglass mat products, the fibers can typically be aged for about 3 days to about 30 days. Ageing the fibers can include simply storing the fibers at room temperature (about 20° C. to about 25° C.) for the desired amount of time prior to being used in making a fiberglass product.

Fiberglass mats can be manufactured in a wet-laid or dry-laid process. In a wet-laid process, chopped bundles of fibers, having suitable length and diameter, can be introduced to an aqueous dispersant medium to produce an aqueous fiber slurry, known in the art as "white water." The fibers in the fiber slurry or white water can have a diameter of about 0.5 µm to about 30 µm and a length of about 5 mm to about 50 mm, for example. The fibers can be sized or unsized and wet or dry, as long as the fibers can be suitably dispersed within the fiber slurry or white water.

The fiber slurry or white water can be agitated to produce a uniform dispersion of fibers having a suitable consistency. In some examples, the white water or the fiber slurry can include fibers in an amount of about 0.01% solids, about 0.03% solids, about 0.05% solids, about 0.1% solids, about 0.5% solids, or about 1% solids to about 2% solids, about 3% solids, about 5% solids, about 7% solids, about 10% solids, about 12% solids, about 15% solids, about 18% solids, about 20% solids, about 25% solids, or about 30% solids. For example, the white water or the fiber slurry can include fibers in an amount of about 0.03% solids to about 25% solids, about 0.5% solids to about 20% solids, about 1% solids to about 13% solids, about 1% solids to about 25% solids, about 10% solids to about 25% solids, or about 13% solids to about 25% solids.

In some examples, a dispersing agent can be present in the fiber slurry or white water in an amount of about 10 ppm to about 8,000 ppm, about 100 ppm to about 5,000 ppm, or about 200 ppm to about 1,000 ppm. The introduction of one or more viscosity modifiers can reduce settling time of the fibers and can improve the dispersion of the fibers in the aqueous solution. The amount of the viscosity modifier used can be effective to provide the viscosity needed to suspend the fibers in the fiber slurry or white water as needed to form the wet laid fiber product. The optional viscosity modifier can be introduced in an amount sufficient to provide a viscosity of about 1 cP, about 1.5 cP, or about 2 cP to about 8 cP, about 12 cP, or about 15 cP (Brookfield Viscometer measured at 25° C.). For example, the optional viscosity modifier can be introduced in an amount sufficient to provide a viscosity of about 1 cP to about 12 cP, about 2 cP to about 10 cP, or about 2 cP to about 6 cP (Brookfield Viscometer measured at 25° C.).

The fiber slurry, diluted or undiluted, can be introduced to a mat-forming machine that can include a mat forming screen, e.g., a wire screen or sheet of fabric, which can form a fiber product and can allow excess water to drain therefrom, thereby forming a wet or damp fiber mat. In some examples, the fibers can be collected on the screen in the form of a wet fiber mat and excess water can be removed by gravity and/or by vacuum assist. The removal of excess water via vacuum assist can include one or a series of vacuums. The fiber mat can be in the form of a non-woven fiber mat.

As discussed above, a curable strengthening resin can be formulated as a liquid and applied onto at least a portion of the dewatered wet fiber mat. Application of the strengthening resin can be accomplished by any conventional processes, such as by soaking the mat in an excess of the strengthening resin solution or suspension, a falling film or curtain coater, or dipping. The amount of the strengthening resin that can be applied to the dewatered fiber mat can be about 5%, about 10%, or about 15% to about 25%, about 30%, about 35%, about 40%, or about 45%, based on the combined solids weight of the plurality of fibers and the strengthening resin. Excess strengthening resin can be removed, for example via a vacuum.

The strengthening resin, once applied to the glass fibers, can be at least partially cured to produce a fibrous composite product. For example, the glass fibers contacted with the strengthening resin can be heated to effect drying and at least partial curing of the strengthening resin. The duration and/or temperature the glass fibers contacted with the strengthening resin is heated can affect the rate of processability and/or handleability of the fibrous composite product and/or the degree of curing and property development of the strengthening resin. The curing temperature can be about 50° C. to about 300° C. or about 90° C. to about 230° C. The curing time can be about 1 second to about 15 minutes. In some examples, the curing temperature can be a temperature of about 25° C. to about 230° C. In one example, the curing temperature can be about 190° C. to about 225° C. and the curing time can be about 1 second, about 2 seconds, or about 3 seconds to about 9 seconds, about 12 seconds, about 15 seconds, about 20 seconds, about 25 seconds, or about 30 seconds.

On heating, at least a portion of the water present in the strengthening resin can evaporate and the strengthening resin can be at least partially cured. These processes can take place in succession or simultaneously. Curing in the present context can be understood as meaning the chemical alteration of the composition, for example, crosslinking through the formation of bonds, including, but not limited to ionic bonds, covalent bonds, hydrogen bonds, between the various constituents of the composition. A specific example of curing can include crosslinking through the esterification reaction between pendant carboxyl (—COOH) of the modified copolymer and the hydroxyl (—OH) moieties both of the modified copolymer and any added polyol. Curing can also include the formation of ionic interactions and clusters between the various constituents of the composition.

Alternatively or in addition to heating the glass fibers contacted with the strengthening resin, catalytic curing can be used to at least partially cure the strengthening resin. In one example, the catalytic curing of the strengthening resin can include the addition of one or more acid catalysts. Illustrative acid catalysts can be or include, but are not limited to, ammonium chloride, p-toluenesulfonic acid, or a mixture thereof.

In some examples, the drying and curing of the strengthening resin can be conducted in two or more distinct steps. For example, the fibers contacted with the strengthening resin can be first heated to a temperature and for a time sufficient to substantially dry but not to substantially cure the strengthening resin and then heated for a second time at a higher temperature and/or for a longer period of time to effect curing (crosslinking to a thermoset structure). Such a preliminary procedure, referred to as "B-staging"—can be used to provide a resin-treated product, for example, in roll form, which may at a later stage be fully cured, with or without forming or molding into a particular configuration, concurrent with the curing process.

The fiber mat product can be formed as a relatively thin product of about 0.25 mm (about 10 mils) to a relatively thick product of about 25.4 mm (about 1,000 mils). Depending on formation conditions, the density of the product can also be varied from a relatively fluffy low density product to a higher density. The fiber mat product can have a density of about 2.72 kg per 0.028 m$^3$ (about 6 lbs/ft$^3$) to about 4.54 kg per 0.028 m$^3$ (about 10 lbs/ft$^3$), or greater.

The fibrous composite product can be made, formed, or otherwise produced by combining one or more polyamidoamines and one or more symmetric crosslinkers to produce an intermediate crosslinked prepolymer, and combining the intermediate crosslinked prepolymer and one or more epihalohydrins to produce a crosslinked resin that can include one or more polyamidoamine backbones at least partially crosslinked by the symmetric crosslinkers. The crosslinked resin and one or more aldehyde-based resins can be combined to produce the strengthening resin. Thereafter, the strengthening resin and the plurality of fibers can be combined, e.g., contacted with one another, to produce one or more fibrous structures, e.g., a non-woven mat and/or a woven mat. The strengthening resin within the fibrous mat can be at least partially cured, if not substantially or completely cured, to produce the fibrous composite product containing the plurality of fibers and the at least partially cured strengthening resin. The fibrous composite product can have an average Elmendorf tear strength of about 400 gf to about 800 gf. The fibrous composite product can have an average dry tensile strength of about 38.6 kg/7.62 cm (about 85 lbs/3") to about 90.7 kg/7.62 cm (about 200 lbs/3"), as measured according to TAPPI/ANSI T 1009 om-10.

The strengthening resin can be combined with the fibrous mat and can be heated to cure and produce the fibrous composite product. The strengthening resin can be heated at a temperature of about 50° C., about 80° C., about 100° C., or about 120° C. to about 150° C., about 200° C., about 250° C., about 300° C., about 350° C., about 400° C., or greater. The strengthening resin can be heated or cured for about 1 second, about 2 seconds, about 5 seconds, about 10 seconds, or about 30 seconds to about 1 minute, about 2 minutes, about 5 minutes, about 10 minutes, about 15 minutes, or longer.

In one specific example, the strengthening resin can be heated at a temperature of about 100° C. to about 350° C. for about 1 second to about 5 minutes. In another specific example, the strengthening resin can be heated at about 150° C. to about 300° C. for about 2 seconds to about 1 minute. In another specific example, the strengthening resin can be heated at about 200° C. to about 280° C. for about 5 seconds to about 30 seconds.

Fiberglass products can be used by themselves or incorporated into a variety of products. For example, fiberglass products can be used as or incorporated into insulation batts or rolls, composite flooring, asphalt roofing shingles, siding, gypsum wall board, roving, microglass-based substrate for printed circuit boards, battery separators, filter stock, tape stock, carpet backing, and as reinforcement scrim in cementitious and non-cementitious coatings for masonry.

Fertilizer Compositions and Products

In other examples, fertilizer compositions and products that have improved strengthening properties, as well as methods for making and using the fertilizer compositions and products, are further discussed and described herein. The fertilizer compositions can include a plant nutrient compound in particulate form. The particulate plant nutrient compound can be referred to as a "core" of the composition. The plant nutrient core can include any conventional plant fertilizer acceptable for use for plant nutrition. In some embodiments, the plant nutrient core can include fertilizer ingredients such as nitrogen, phosphorus, potassium, sulfur, silicon, magnesium, calcium, manganese, boron, iron, like materials, and combinations thereof. Non-limiting examples of plant nutrient compounds that can be present in the plant nutrient core can include: urea; ammonium nitrate; ammonium magnesium nitrate; ammonium chloride; ammonium sulfate; ammonium phosphate; sodium nitrate; calcium nitrate; potassium nitrate; lime nitrogen; urea-form; crotonylidene diurea (CDU); isobutylidene diurea (IBDU); guanylurea (GU); phosphate fertilizer (e.g., calcium superphosphate, concentrated superphosphate, fused phosphate, humic acid phosphorus fertilizer, calcined phosphate, calcined concentrated phosphate, magnesium superphosphate, ammonium polyphosphate, potassium metaphosphate, calcium metaphosphate, magnesium phosphate, ammonium sulfate phosphate, ammonium potassium nitrate phosphate, and ammonium chloride phosphate); potash fertilizer (e.g., potassium chloride, potassium sulfate, potassium sodium sulfate, potassium sulfate magnesia, potassium bicarbonate, and potassium phosphate); muriate of potash (MOP), which refers to potassium containing compositions which can include potassium chloride, potassium carbonate, potassium hydroxide, potassium chlorate, potassium nitrate, potassium sulfate, potassium permanganate, and the like; sulfate of potash (SOP), a composition of ca. 50% potassium oxide ($K_2O$); silicate fertilizer (e.g., calcium silicate); magnesium fertilizer (e.g., magnesium sulfate and magnesium chloride); calcium fertilizer (e.g., calcium oxide, calcium hydroxide, and calcium carbonate); manganese fertilizer (e.g., manganese sulfate, manganese sulfate magnesia, and manganese slag); boron fertilizer (e.g., boric acid and borates); iron fertilizer (e.g., slag); and K-Mag, which is a potassium, magnesium, and sulfur based fertilizer. Other plant nutrient compounds that can be provided in a solid form may likewise be utilized as a plant nutrient core in the fertilizer composition of this disclosure.

The plant nutrient core can exist in a variety of forms including, but not limited to, granulated, prilled, pelletized, powdered, pastilled, or compounded. The plant nutrient core further can exist in a variety of shapes (including regular and irregular shapes) and can be substantially spherical in some embodiments. The plant nutrient core also can exist in a variety of sizes such as, for example, about 0.1 mm to about 10 mm, about 0.2 mm to about 9 mm, about 0.3 mm to about 8 mm, or about 0.5 mm to about 7 mm.

The plant nutrient core can include one or more coating layers or films. The plant nutrient core can include at least one coating layer containing a strengthening resin as described herein. The strengthening resin can include an aldehyde-based resin such as, for example, a urea-formaldehyde resin. In some embodiments, the aldehyde-based resin can be crosslinked. As a non-limiting example, isocyanates can be utilized as a crosslinking agent, such as methylene diphenyl diisocyanate. Other crosslinkers as described herein may also be utilized. Further, latent crosslinkers can be utilized. In some embodiments, blocked acid catalysts can be used for thermoset polymers, such as aldehyde-based resins. As a non-limiting example, amine-blocked acids can be used and, upon reaching a defined processing temperature, the amine moiety can be released (e.g., evaporated) allowing the remaining acid moiety to function as a catalyst.

In some embodiments, the strengthening resin applied to the plant nutrient core can include the aldehyde-based resin combined with a crosslinked resin as described herein. An aldehyde-based resin having a crosslinked resin combined therewith can be characterized as a modified aldehyde-based resin (e.g., a modified UF resin). In particular, the crosslinked resin can include a polyamidoamine backbone, which can be at least partially crosslinked. In some examples, the polyamidoamine backbone can be at least partially crosslinked by one or more epihalohydrin crosslinks. As a non-limiting example, a strengthening resin applied to a plant nutrient core can include an aldehyde-based resin (e.g., a UF resin) combined with a polyamide-epihalohydrin (PAE) additive (e.g., a polyamidoamine-epichlorohydrin additive).

The plant nutrient core further can include at least one coating layer containing a water insoluble material. The water-insoluble material can be selected from a wide variety of compounds, including, but not limited to, waxes, fatty acids, fatty acid esters, higher alcohols (e.g., C9 or greater alcohols), and combinations thereof. In some embodiments, a wax in particular can be used as the water insoluble material. For example, an organic wax, such as an olefinic wax, can be used. More specifically, a wax having a carbon chain length of C20 or more, C25 or more, or C30 or more can be used.

In some embodiments, a fertilizer composition can include a plant nutrient core with at least one coating layer of an aldehyde-based resin (or modified aldehyde-based resin) and at least one coating layer of a water insoluble material, such as a wax. A "coating layer" may completely coat the immediately underlying material (i.e., the plant nutrient core or a coating layer of an aldehyde-based resin or a coating layer of a water insoluble material). A coating layer alternatively may substantially coat the immediately underlying material (i.e., covering at least about 75%, at least about 80%, at least about 85%, at least about 90%, or at least about 95% of the exposed surface area of the underlying material). Preferably, when at least two coating layers are present, the plant nutrient core is completely covered by the totality of the applied coating layers.

The plant nutrient core may have at least 1, at least 2, at least 3, at least 4, at least 5, at least 6, or at least 7 coating layers of the aldehyde-based resin. In some embodiments, the plant nutrient core may have 1 to 15 coating layers, 2 to 12 coating layers, 3 to 10 coating layers, or 4 to 8 coating layers of the aldehyde-based resin. The plant nutrient core may have at least 1, at least 2, at least 3, at least 4, or at least 5 coating layers of the water insoluble material. In some embodiments, the plant nutrient core may have 1 to 10, 2 to 8, or 2 to 6 coating layers of the water insoluble material. The aldehyde-based resin coating and the water insoluble material coating can be present on the plant nutrient core as alternating layers with any number of each coating layer being present sequentially. The plant nutrient core may have a plurality of aldehyde-based resin coating layers covered by one or more water insoluble material coating layers. Where the plant nutrient core is represented as "C", the aldehyde-based resin coating layer is represented as "A", and the water insoluble coating layer is represented as "W", the following layer patterns are provided as non-limiting examples: CAW; CAAW; CAAAW; CAWW; CAAWW; CAAAWWW; CAWAW; CAWAWAW; CAAWAAW; CAAWWAAWW; CAWAAAAAW; CAWAAAAAWA; CWA; CWAA; CWWA; CWWAA, CWAW; CWAAW; and so on. In some embodiments, the outermost coating layer can be an aldehyde-based resin layer. In some embodiments, the outermost coating layer can be a water insoluble material layer. In some embodiments, the innermost coating layer can be an aldehyde-based resin layer. In some embodiments, the innermost coating layer can be a water insoluble material layer. In some embodiments, two or more different aldehyde-based resins can be used for different coating layers on the same plant nutrient core. For example, an unmodified aldehyde-based resin can be used for one or more coating layers on a plant nutrient core, and a modified aldehyde-based resin can be used for one or more coating layers on the same plant nutrient core. In some embodiments, two or more different water insoluble material compositions can be used for different coating layers on the same plant nutrient core.

The total amount of the strengthening resin present in the composition can be about 1% to about 50% by weight, about 2% to about 40% by weight, about 3% to about 30% by weight, about 4% to about 20% by weight, or about 5% to about 15% by weight relative to the weight of the plant nutrient core. In further embodiments, the total amount of the strengthening resin present in the composition can be about 2% to about 15% or about 3% to about 12% by weight relative to the weight of the plant nutrient core. The total amount of the water insoluble material present in the composition can be about 0.01% to about 5%, about 0.05% to about 4%, about 0.1% to about 3%, about 0.2% to about 2%, or about 0.3% to about 1.5% by weight relative to the weight of the plant nutrient core. The strengthening resin coating layer(s) and the water insoluble material coating layer(s) can be present in a weight ratio of about 1:5 to about 20:1, about 1:4 to about 18:1, about 1:2 to about 15:1, or about 1:1 to about 12:1. In some embodiments, the strengthening resin coating layer(s) and the water insoluble material coating layer(s) can be present in a weight ratio of 2:1 to about 20:1, about 3:1 to about 18:1, or about 4:1 to about 15:1.

The fertilizer composition can be prepared according to any coating method. For example, rotary drum coating and/or fluidized bed coating methods can be used.

In some embodiments, methods for forming a fertilizer composition can include contacting a plant nutrient core (i.e., a plant nutrient composition in a particulate or similar form) with a strengthening resin as described herein to provide a coating layer of the strengthening resin thereon and contacting the so-coated composition with a water insoluble material to provide a coating layer of the water insoluble material thereon. Methods further can include curing the coating layer(s). Optionally, each coating layer applied to the plant nutrient core can be substantially cured before addition of a subsequent coating layer. Application of the coating layer to a plant nutrient core particle can be carried out at specific temperature for a specific duration. For example, a processing temperature can be about 50° C. to about 200° C., about 60° C. to about 175° C., or about 70° C. to about 150° C. Application time can be about 0.1 min. to about 10 min., about 0.25 min. to about 7 min., or about 0.5 min. to about 5 min. Curing of the applied coating layer can include holding the coated particle at the processing temperature for defined length of time (optionally with continuous mixing). A curing time, for example, can be about 0.5 min. to about 30 min., about 1 min. to about 25 min., or about 5 min. to about 20 min. In some embodiments, a coating layer of the strengthening resin can be applied and/or cured at a temperature of about 50° C. to about 200° C. Likewise, in some embodiments, a coating layer can be applied and/or cured over a time of about 1 minute to about 20 minutes. The temperature during such curing time can be, in some embodiments, about 60° C. to about 190° C., about 80° C. to about 180° C., or about 90° C. to about 170° C. The time for curing over any of the above temperature ranges can be about 1 minute to about 18 minutes, about 2 minutes to about 16 minutes, or about 3 minutes to about 15 minutes.

A fertilizer composition can include a plant nutrient core having a strengthening resin coating layer and a water insoluble coating layer thereon can exhibit improved attributes in relation to known coated fertilizers, particularly controlled release fertilizers. The fertilizer compositions of the present disclosure can exhibit improved impact and abrasion resistance, can be manufactured at a reduced cost and can undergo controlled release of the plant nutrient core in a manner that is consistent with industry standards for a controlled release fertilizer composition and that is similar to known controlled release fertilizer compositions.

EXAMPLES

In order to provide a better understanding of the foregoing discussion, the following non-limiting examples are offered. Although the examples can be directed to specific embodiments, they are not to be viewed as limiting the invention in any specific respect.

In regard to Examples 1-7, related to strengthened fibrous composite products, for inventive examples (Exs. 3 and 7) and comparative examples (CExs. 1, 2, and 4-6) discussed herein, a handsheet study was performed for each sample. A Rohm and Haas model 4297 mixer was used to blend the mixtures. Dilutions were made to about 13% solids with PAA white water, an aqueous solution of polyacrylamide. The handsheets were cured at a temperature of about 240° C. for about 10 seconds. For Examples 3 and 7, the polyamidoamine-methylenebisacrylamide-epichlorohydrin ("PPA-MBA-EPA") cross-linked resin was prepared according to methods discussed and described in U.S. Pat. Nos. 5,567,798; 5,585,456; and 8,246,781; U.S. Publication Nos.: 2012/0064323; 2014/0020858; and 2014/0166223.

Four handsheets were made for each example and the average value for each property is shown in Tables 1 and 2 below. The handsheets were about 26.7 cm× about 26.7 cm (about 10.5 in× about 10.5 in). The thickness of the handsheets prior to curing, i.e., while wet, were not measured. The thickness of the handsheets after curing were about 0.89 mm (about 35 mils). The glass fibers (OC 9501) had an average length of about 3.18 cm.

Comparative Examples 1-2

Comparative Example (CEx. 1) was urea-formaldehyde resin and Comparative Example (CEx. 2) was a latex (about 7.5% solids) modified urea-formaldehyde resin that yielded a high tear strength glass mat. The urea-formaldehyde resin of CEx. 1, before modified with the latex to make CEx. 2, is referred to herein as the "unmodified UF resin." The latex modified urea-formaldehyde resin was blended, at room temperature (about 25° C.), directly with the urea-formaldehyde resin for about 30 min.

Example 3

Example 3 (Ex. 3) was a urea-formaldehyde resin modified with the PPA-MBA-EPA crosslinked resin. About 3% solids of the PPA-MBA-EPA crosslinked resin was added to the urea-formaldehyde resin at room temperature (about 25° C.) and blended for about 10 min.

TABLE 1

| Ex. No. | Additive (solids %) | Avg. Dry Tensile (kg/7.62 cm) [lbs/3 in] | BW (kg/9.29 m$^2$) [lbs/100 ft$^2$] | Avg. Tear (gf) | % LOI | $DT_N$ | % HW |
|---|---|---|---|---|---|---|---|
| CEx. 1 | — | 37.6 [83] | 0.76 [1.68] | 469 | 14.8 | 3.35 | 70 |
| CEx. 2 | latex (7.5) | 37.2 [82] | 0.76 [1.68] | 479 | 15.1 | 3.22 | 77 |
| Ex. 3 | PPA-MBA-EPA (3) | 42.2 [93] | 0.77 [1.69] | 571 | 14.5 | 3.78 | 72 |

Comparative Examples 4-6

Comparative Example (CEx. 4) was urea-formaldehyde resin. Comparative Example (CEx. 5) was an SMA (about 3% solids) modified urea-formaldehyde resin. Comparative Example (CEx. 5) was a latex (about 7.5% solids) modified urea-formaldehyde resin. The urea-formaldehyde resin of CEx. 4, before modified to make CExs. 5 and 6, is referred to herein as the "unmodified UF resin." The SMA modified urea-formaldehyde resin was blended, at room temperature (about 25° C.), directly with the urea-formaldehyde resin for about 30 min. The latex modified urea-formaldehyde resin was blended, at room temperature (about 25° C.), directly with the urea-formaldehyde resin for about 30 min.

Example 7

Example 7 (Ex. 7) was a urea-formaldehyde resin modified with the PPA-MBA-EPA crosslinked resin. About 3% solids of the PPA-MBA-EPA crosslinked resin was added to the urea-formaldehyde resin at room temperature (about 25° C.) and blended for about 10 min.

TABLE 2

| Ex. No. | Additive (solids %) | Avg. Dry Tensile (kg/7.62 cm) [lbs/3 in] | BW (kg/9.29 m²) [lbs/100 ft²] | Avg. Tear (gf) | % LOI | $DT_N$ | % HW |
|---|---|---|---|---|---|---|---|
| CEx. 4 | — | 35.8 [79] | 0.77 [1.69] | 466 | 15.1 | 3.14 | 83 |
| CEx. 5 | SMA (3) | 42.6 [94] | 0.76 [1.67] | 487 | 15.3 | 3.65 | 75 |
| CEx. 6 | latex (7.5) | 44 [97] | 0.78 [1.71] | 420 | 15.2 | 3.81 | 60 |
| Ex. 7 | PPA-MBA-EPA (3) | 52.6 [116] | 0.78 [1.71] | 555 | 15 | 4.45 | 63 |

The average dry tensile strength and the Elmendorf tear strength values were determined according to the following procedures. All of the examples (Exs. 3 and 7) and comparative examples (CExs. 1, 2, and 4-6) were tested for dry tensile strength on a Thwing-Albert tensile tester (0-200 kg load cell), and measured according to TAPPI/ANSI T 1009. All of the examples were tested for Elmendorf tear strength on a Thwing-Albert Pro Tear (1,600 g pendulum). In measuring the Elmendorf tear strength, the instrument was leveled and calibrated before testing. The test samples were cut to a width of 63 mm (2.48 in.) in the tearing direction and a length of about 75 mm (3 in.). The samples were long enough to be held by the full width of each sample clamp. The test samples were placed in the clamps of the tester while ensuring that the bottom of each sample rested squarely on the bottom of the sample clamps. The sample was aligned with the front edge of the pendulum clamp. Any excess material was allowed to hang over the rear of the stationary clamp. The clamps were then closed. The cutter handle was then pressed all the way down to cut a 20 mm (0.79 in) slit in the sample. The "test" key of the instrument was then pressed and the pendulum was allowed to make one full swing in the tearing direction and the pendulum was stopped on the return swing and gently lowered until the pendulum rested against the pendulum stop.

Percent loss of ignition ("% LOI") was determined by weighing samples after 30 min at 650° C. Percent hot-wet retention ("% HW") is the amount of dry tensile strength retained after immersing the sample in an 80° C. water bath for 10 min. Replications for each test were made and standard deviations for each example were calculated. The average tear strength values shown in Tables 1-2 are the average of 12 measurements, i.e., the average of three tests performed on each of the four handsheets per example. The dry tensile number ("$DT_N$") values shown in Tables 1-2 are the average of eight measurements, i.e., the average of two tests performed on each of the four handsheets per example. The percent loss of ignition ("LOI") and Basis Weight ("BW") shown in Tables 1-2 are the average of four measurements, i.e., the average of one test performed on each of the four handsheets per example.

Referring to Table 1, Ex. 3 had an average dry tensile strength ("Avg. DT") value of about 42.2 kg/7.62 cm that was greater than the CExs. 1 and 2 that had Avg. DT values of about 37.6 kg/7.62 cm and about 37.2 kg/7.62 cm, respectively. Also, Ex. 3 had an average tear strength ("Avg. Tear") value of about 571 gf that was greater than the CExs. 1 and 2 that had Avg. Tear values of about 469 gf and about 479 gf, respectively. All examples and comparative examples in Table 1 had a hot-wet retention rate ("% HW") >70%.

Due to the variation in basis weight ("BW"), loss of ignition ("LOI"), and hot-wet retention ("HW"), the dry tensile number ("$DT_N$") was calculated for each resin composition. The $DT_N$ was determined from the following equation: $DT_N$=(average dry tensile strength)/(% LOI×BW), where the average dry tensile strength is in units of "lbs/3 in" and the BW is in units of "lbs/100 ft²". When $DT_N$ was calculated, there was a significant improvement noted for Ex. 3 over the CExs. 1 and 2. Specifically, Ex. 3 had a $DT_N$ value of 3.78, while the CExs. 1 and 2 had $DT_N$ values of 3.35 and 3.22, respectively.

Referring to Table 2, Ex. 7 had an Avg. DT value of about 52.6 kg/7.62 cm that was greater than the CExs. 4-6 that had Avg. DT values of about 35.8 kg/7.62 cm, about 42.6 kg/7.62 cm, and about 44 kg/7.62 cm, respectively. Also, Ex. 7 had an Avg. Tear value of about 555 gf that was significantly greater than the Avg. Tear values of CExs. 4-6, which were about 466 gf, about 487 gf, and about 420 gf, respectively. All examples and comparative examples in Table 2 had a hot-wet retention rate ("% HW") >60%.

When $DT_N$ was calculated, there was a significant improvement noted for Ex. 7 over the CExs. 4-6. Specifically, Ex. 7 had a $DT_N$ values of 4.45, while the CExs. 4-6 had $DT_N$ values of 3.14, 3.65, and 3.81, respectively.

The following examples, Examples 8-22, are related to fertilizer compositions.

Example 8

A fertilizer composition was prepared as a core plant nutrient having a plurality of aldehyde-based resin coating layers and a plurality of wax coating layers thereon. In the preparation, about 1 kg of a particulate fertilizer—muriate of potash (MOP) was added to a rotary drum coater. The drum was rotated at a constant drum speed of about 15-16 rpm while heated at a temperature of about 110° C. to provide a cascading flow of the fertilizer. A blend of about 183.3 g of UF resin (GP 839G18) and a latent catalyst (GP 902G03—an amine-blocked acid catalyst) was formed. The blended UF resin (about 21.6 g) was added to the drum coater over the fertilizer by spraying or with a syringe over a time of about 1 min. Thereafter, the mixture was allowed to cure at about 110° C. for about 5 min.

Next, about 5 g of C30+ alpha-olefin wax was added to the drum and rotated for approximately 3 min. Thereafter, blended UF resin (about 21.6 g) was added to the drum coater over the fertilizer by spraying or with a syringe over a time of about 1 min, and the mixture was again allowed to cure at about 110° C. for about 5 min. This coating step was repeated an additional 5 times and then about 5 g of C30+ alpha-olefin wax was added to the drum and rotated for approximately 3 min. Finally, blended UF resin (about 21.6 g) was again added to the drum coater over the fertilizer by spraying or with a syringe over a time of about 1 min, and the mixture was again allowed to cure at about 110° C. for about 5 min. The product was thereafter cooled with continuous agitation to a temperature of about 45° C. The product was emptied out of the drum and cooled to ambient temperature. The sum of the UF coating was approximately 10% by weight relative to the weight of the fertilizer core.

Example 9

A fertilizer composition was prepared as a core plant nutrient having a plurality of aldehyde-based resin coating layers and a plurality of wax coating layers thereon. In the preparation, about 1 kg of a particulate fertilizer (MOP) was added to a rotary drum coater. The drum was rotated at a constant drum speed of about 15-16 rpm while heated at a temperature of about 110° C. to provide a cascading flow of the fertilizer. A blend of about 250 g of UF resin (GP 839G18), about 18.1 g of PPA-MBA-EPA, and about 9 g of latent catalyst (GP 902G03) was formed. The blended UF resin (about 23.1 g) was added to the drum coater over the fertilizer by spraying or with a syringe over a time of about 1 min. Thereafter, the mixture was allowed to cure at about 110° C. for about 5 min.

Next, about 5 g of C30+ alpha-olefin wax was added to the drum and rotated for approximately 3 min. Thereafter, blended UF resin (about 23.1 g) was added to the drum coater over the fertilizer by spraying or with a syringe over a time of about 1 min, and the mixture was again allowed to cure at about 110° C. for about 5 min. This coating step was repeated an additional 5 times and then about 5 g of C30+ alpha-olefin wax was added to the drum and rotated for approximately 3 min. Finally, blended UF resin (about 23.1 g) was again added to the drum coater over the fertilizer by spraying or with a syringe over a time of about 1 min, and the mixture was again allowed to cure at about 110° C. for about 5 min. The product was thereafter cooled with continuous agitation to a temperature of about 45° C. The product was emptied out of the drum and cooled to ambient temperature. The sum of the UF coating was approximately 10% by weight relative to the weight of the fertilizer core.

Example 10

A fertilizer composition was prepared as a core plant nutrient having a plurality of aldehyde-based resin coating layers and a plurality of wax coating layers thereon. In the preparation, about 1 kg of a particulate fertilizer (MOP) was added to a rotary drum coater. The drum was rotated at a constant drum speed of about 15-16 rpm while heated at a temperature of about 110° C. to provide a cascading flow of the fertilizer. A blend of about 183.3 g of UF resin (GP 839G18), PPA-MBA-EPA, about 22.5 g polymeric methylene diphenyl diisocyanate (pMDI), and latent catalyst (GP 902G03) was formed. The blended UF resin (about 19.7 g) was added to the drum coater over the fertilizer by spraying or with a syringe over a time of about 1 min. Thereafter, the mixture was allowed to cure at about 110° C. for about 5 min.

Next, about 5 g of C30+ alpha-olefin wax was added to the drum and rotated for approximately 3 min. Thereafter, blended UF resin (about 19.7 g) was added to the drum coater over the fertilizer by spraying or with a syringe over a time of about 1 min, and the mixture was again allowed to cure at about 110° C. for about 5 min. This coating step was repeated an additional 5 times and then about 5 g of C30+ alpha-olefin wax was added to the drum and rotated for approximately 3 min. Finally, blended UF resin (about 19.7 g) was again added to the drum coater over the fertilizer by spraying or with a syringe over a time of about 1 min, and the mixture was again allowed to cure at about 110° C. for about 5 min. The product was thereafter cooled with continuous agitation to a temperature of about 45° C. The product was emptied out of the drum and cooled to ambient temperature. The sum of the UF coating was approximately 10% by weight relative to the weight of the fertilizer core.

Example 11

A fertilizer composition was prepared according to the same method provided in Example 10. In the present example, however, 2.81 g of polymeric methylene diphenyl diisocyanate was added to the drum coater via syringe after each addition of the C30+ alpha-olefin wax.

Example 12

A fertilizer composition was prepared as a core plant nutrient having a plurality of aldehyde-based resin coating layers and a plurality of wax coating layers thereon. In the preparation, about 1 kg of a particulate fertilizer (MOP) was added to a rotary drum coater. The drum was rotated at a constant drum speed of about 15-16 rpm while heated at a temperature of about 110° C. to provide a cascading flow of the fertilizer. A blend of about 128.3 g of UF resin (GP 245G93), about 30.9 g of PPA-MBA-PAE, and 4.62 g of latent catalyst (902G03) was formed. 3.5 g of C30+ alpha-olefin wax was added to the drum and rotated for approximately 3 min. The blended UF resin (about 37.25 g) was added to the drum coater over the fertilizer by spraying or with a syringe over a time of about 1 min. Thereafter, the mixture was allowed to cure at about 110° C. for about 12 min. This coating step was repeated an additional 3 times. The product was thereafter cooled with continuous agitation to a temperature of about 45° C. The product was emptied out of the drum and cooled to ambient temperature. The sum of the UF coating was approximately 7% by weight relative to the weight of the fertilizer core.

Example 13

A fertilizer composition was prepared as a core plant nutrient having a plurality of aldehyde-based resin coating layers and a plurality of wax coating layers thereon. In the preparation, about 1 kg of a particulate fertilizer (MOP) was added to a rotary drum coater. The drum was rotated at a constant drum speed of about 15-16 rpm while heated at a temperature of about 110° C. to provide a cascading flow of the fertilizer. A blend of about 55 g of UF resin (GP 245G93), about 13.3 g of PPA-MBA-PAE, and about 1.98 g of latent catalyst (902G03) was formed. Next, 2 g of C30+ alpha-olefin wax was added to the drum and rotated for approximately 3 min. The blended UF resin (about 21.3 g) was added to the drum coater over the fertilizer by spraying or with a syringe over a time of about 1 min. Thereafter, the mixture was allowed to cure at about 110° C. for about 12 min. This coating step was repeated an additional 2 times and then about 6 g of polyethylene-based hot melt adhesive (e.g., HL-0765 available from H. B. Fuller) was added to the drum and rotated for approximately 3 min. The product was thereafter cooled with continuous agitation to a temperature of about 45° C. The product was emptied out of the drum and cooled to ambient temperature. The sum of the UF coating was approximately 3% by weight relative to the weight of the fertilizer core.

Example 14

A fertilizer composition was prepared as a core plant nutrient having a plurality of aldehyde-based resin coating layers and a plurality of wax coating layers thereon. In the preparation, about 1 kg of a particulate fertilizer (MOP) was added to a rotary drum coater. The drum was rotated at a constant drum speed of about 15-16 rpm while heated at a temperature of about 110° C. to provide a cascading flow of the fertilizer. A blend of about 55 g of UF resin (GP 245G93), about 13.3 g of PPA-MBA-EPA, and about 1.98 g of latent catalyst (902G03) was formed. Next, 2 g of 1:1 mixture of C30+ alpha-olefin wax: HL-0765 (molten) was added to the drum and rotated for approximately 3 min. The blended UF resin (about 21.3 g) was added to the drum coater over the fertilizer by spraying or with a syringe over a time of about 1 min. Thereafter, the mixture was allowed to cure at about 110° C. for about 12 min. This coating step was repeated and then about 6 g 1:1 mixture of C30+ alpha-olefin wax: HL-0765 (molten) was added to the drum and rotated for approximately 3 min. The product was thereafter cooled with continuous agitation to a temperature of about 45° C. The product was emptied out of the drum and cooled to ambient temperature. The sum of the UF coating was approximately 3% by weight relative to the weight of the fertilizer core.

Example 15

A fertilizer composition was prepared as a core plant nutrient having a plurality of aldehyde-based resin coating layers and a plurality of wax coating layers thereon. In the preparation, about 1 kg of a particulate fertilizer (MOP) was added to a rotary drum coater. The drum was rotated at a constant drum speed of about 15-16 rpm while heated at a temperature of about 110° C. to provide a cascading flow of the fertilizer. Next, 7 g of C30+ alpha-olefin wax was added to the drum and rotated for approximately 3 min. Thereafter, 35 g of GP 5510 resin (phenolic-formaldehyde) was added to the drum coater over the fertilizer over a time of about 1 min. The mixture was allowed to stir at about 110° C. for about 3 min. A second application of 35 g of GP 5510 resin was added to the drum coater over the fertilizer over a time of about 1 min. Thereafter, the temperature was increased to 150° C. Thereafter, the mixture was allowed to cure at about 150° C. for about 5 min. The product was thereafter cooled with continuous agitation to a temperature of about 45° C. The product was emptied out of the drum and cooled to ambient temperature. The sum of the PF coating was approximately 7% by weight relative to the weight of the fertilizer core.

Example 16

A fertilizer composition was prepared as a core plant nutrient having a plurality of aldehyde-based resin coating layers and a plurality of wax coating layers thereon. In the preparation, about 1 kg of a particulate fertilizer (MOP) was added to a rotary drum coater. The drum was rotated at a constant drum speed of about 15-16 rpm while heated at a temperature of about 110° C. to provide a cascading flow of the fertilizer. A blend of about 183 g of UF resin (GP 245G93), about 22.3 g of PPA-MBA-EPA, and about 6.6 g of latent catalyst (902G03) was formed. The blended UF resin (about 48.17 g) was added to the drum coater over the fertilizer by spraying or with a syringe over a time of about 1 min. Thereafter, the mixture was allowed to cure at about 110° C. for about 12 min. An additional application of blended UF resin (48.17 g) was added to the drum coater over the fertilizer by spraying or with a syringe over a time of about 1 min. Thereafter, the mixture was allowed to cure at about 110° C. for about 12 min. Next, about 5 g of C30+ alpha-olefin wax was added to the drum and rotated for approximately 3 min. This coating step was repeated an additional time. Finally, blended UF resin (about 48.17 g) was again added to the drum coater over the fertilizer by spraying or with a syringe over a time of about 1 min, and the mixture was again allowed to cure at about 110° C. for about 5 min. The product was thereafter cooled with continuous agitation to a temperature of about 45° C. The product was emptied out of the drum and cooled to ambient temperature. The sum of the UF coating was approximately 10% by weight relative to the weight of the fertilizer core.

Example 17

A fertilizer composition was prepared as a core plant nutrient having a plurality of aldehyde-based resin coating layers and a plurality of wax coating layers thereon. In the preparation, about 1 kg of a particulate fertilizer (MOP) was added to a rotary drum coater. The drum was rotated at a constant drum speed of about 15-16 rpm while heated at a temperature of about 150° C. to provide a cascading flow of the fertilizer. A blend of about 128 g of UF resin (GP 245G93), about 30.9 g of PPA-MBA-EPA, 7.7 g of GP 5510, and about 4.62 g of latent catalyst (902G03) was formed. 3.5 g of C30+ alpha-olefin wax was added to the drum and rotated for approximately 3 min. The blended UF resin (about 39.0 g) was added to the drum coater over the fertilizer by spraying or with a syringe over a time of about 1 min. Thereafter, the mixture was allowed to cure at about 150° C. for about 12 min. Next, about 3.5 g of C30+ alpha-olefin wax was added to the drum and rotated for approximately 3 min. Thereafter, blended UF resin (about 39.0 g) was added to the drum coater over the fertilizer by spraying or with a syringe over a time of about 1 min, and the mixture was again allowed to cure at about 150° C. for about 12 min. This coating step was repeated an additional time and then about 5 g of C30+ alpha-olefin wax was added to the drum and rotated for approximately 3 min. Finally, blended UF resin (about 39.0 g) was again added to the drum coater over the fertilizer by spraying or with a syringe over a time of about 1 min, and the mixture was again allowed to cure at about 150° C. for about 12 min. The product was thereafter cooled with continuous agitation to a temperature of about 45° C. The product was emptied out of the drum and cooled to ambient temperature. The sum of the UF coating was approximately 7% by weight relative to the weight of the fertilizer core.

Example 18

A fertilizer composition was prepared as a core plant nutrient having a plurality of aldehyde-based resin coating layers and a plurality of wax coating layers thereon. In the preparation, about 1 kg of a particulate fertilizer (MOP) was added to a rotary drum coater. The drum was rotated at a constant drum speed of about 15-16 rpm while heated at a temperature of about 110° C. to provide a cascading flow of the fertilizer. A blend of about 128.3 g of UF resin (GP 245G93), about 30.9 g of PPA-MBA-PAE, and 4.62 g of latent catalyst (902G03) was formed. Next, 3.5 g of C30+ alpha-olefin wax was added to the drum and rotated for approximately 3 min. The blended UF resin (about 37.25 g) was added to the drum coater over the fertilizer by spraying or with a syringe over a time of about 1 min. Thereafter, the mixture was allowed to cure at about 110° C. for about 12 min. This coating step was repeated an additional 3 times. Finally, 7.0 g of HL-0765 was added to the drum and rotated for approximately 3 min. The product was thereafter cooled with continuous agitation to a temperature of about 45° C. The product was emptied out of the drum and cooled to ambient temperature. The sum of the UF coating was approximately 7% by weight relative to the weight of the fertilizer core.

Example 19

A fertilizer composition was prepared as a core plant nutrient having a plurality of aldehyde-based resin coating layers and a plurality of wax coating layers thereon. In the preparation, about 1 kg of a particulate fertilizer (urea) was added to a rotary drum coater. The drum was rotated at a constant drum speed of about 15-16 rpm while heated at a temperature of about 80° C. to provide a cascading flow of the fertilizer. A blend of about 128.3 g of UF resin (GP 245G93) and about 30.8 g of PPA-MBA-PAE was formed. A 10% aqueous solution of maleic anhydride was prepared. Next, 5 g of C30+ alpha-olefin wax was added to the drum and rotated for approximately 3 min. The blended UF resin (about 29.2 g) was added to the drum coater over the fertilizer by spraying or with a syringe over a time of about 1 min. The aqueous maleic anhydride solution (about 7 g) was added to the drum coater over the fertilizer by spraying or with a syringe over a time of about 1 min. Thereafter, the mixture was allowed to cure at about 110° C. for about 12 min. This coating step was repeated an additional 3 times. The product was thereafter cooled with continuous agitation to a temperature of about 45° C. The product was emptied out of the drum and cooled to ambient temperature. The sum of the UF coating was approximately 7% by weight relative to the weight of the fertilizer core.

Example 20

Testing was carried out to evaluate loss of plant nutrient in soil using a sample of the fertilizer composition prepared according to Example 12. As comparatives, testing was also carried out using samples of polyurethane coated MOP (POLYON®, available from Koch Agronomic Services) and polyurethane coated urea (ESN®, available from Agrium). For testing, 15 g of each sample was placed in separate nylon mesh bags, 200 g of soil was placed in an open plastic container, and the nylon mesh bags with the samples were buried approximately one-third of the way below the soil surface in the container. The samples were made in sets of 6 so data could be obtained for multiple weeks. The samples were placed in an incubator set at 25° C. and 90% humidity. After the two week reading, water was added in an amount approximately equal to 10% of the weight of the soil.

The samples were analyzed once a week for nutrient release. Analysis was completed by taking 10 g of sample from each nylon mesh bag, grinding to a powder form, adding 100 mL DI water to dissolve the powder and form a sample to water ration of 1:10. The refractive index (RI) value of the wash water, which is indicative of the amount of the sample lost to the wash water, was measured using a Rudolph Research J457 Automatic Refractometer. The RI for each aliquot was then plotted as percent released versus time. Percent loss for each sample is shown in FIG. 1.

Example 21

Testing was carried out to evaluate loss of plant nutrient in soil using the same materials used in Example 20. For testing, 15 g of each sample was placed in separate nylon mesh bags, 200 g of soil was placed in an open plastic container with drain holes present in the container, and the sample bags were buried approximately one-third of the way below the soil surface in the container. Deionized water (100 ml) was added weekly to each sample. The samples were made in triplicates in sets of 6 so data could be obtained for multiple weeks. The samples were placed in an incubator set at 30° C. and 80% humidity. The samples were analyzed once a week for nutrient release per the method described in Example 20. An additional 20 ml of deionized water was added after the weekly readings. Analysis was completed by taking 10 g of sample from each nylon mesh bag and grinding with 100 mL DI water and reading the RI value of the wash water. The average percent loss for the plant nutrient over the course of four weeks for each of the three samples is shown in FIG. 2.

Example 22

Testing was carried out to evaluate loss of plant nutrient in soil using a sample of the fertilizer composition prepared according to Examples 12, 13, 14, 16, 18, and 19. As comparatives, testing was also carried out using the POLYON® and ESN® samples described in Example 20. For testing, 15 g of each sample was placed in nylon mesh bags, 200 g of soil was placed in an open plastic container, the sample bags were buried approximately one-third of the way below the soil surface, and 20 ml of deionized water was added to each sample. The samples were made in triplicates in sets of 6 so data could be obtained for multiple weeks. The samples were placed in an incubator set at 30° C. and 90% humidity. The samples were analyzed once a week for nutrient release per the method described in Example 20. Analysis was completed by taking 10 g of sample from each nylon mesh bag and grinding with 100 mL DI water and reading the RI value of the wash water. Average percent loss values for the MOP samples is shown in FIG. 3, and average percent loss values for urea is shown in FIG. 4.

Embodiments of the present disclosure further relate to any one or more of the following paragraphs:

1. A fibrous composite product, comprising: a fiber web; and an at least partially cured strengthening resin, wherein prior to curing, the strengthening resin comprises: an aldehyde-based resin; and a crosslinked resin comprising a polyamidoamine backbone at least partially crosslinked by a symmetric crosslink and comprising azetidinium functional groups; wherein the aldehyde-based resin is present in the strengthening resin in an amount of about 85% to about 99.5%, based on the combined solids weight of the crosslinked resin and the aldehyde-based resin, wherein the at least partially cured strengthening resin is present in the fibrous composite product in an amount of about 10% to about 40%, based on the combined solids weight of the fiber web and the at least partially cured strengthening resin, and wherein the fibrous composite product has an average dry tensile strength of about 38.6 kg/7.62 cm (about 85 lbs/3") to about 90.7 kg/7.62 cm (about 200 lbs/3"), as measured according to TAPPI/ANSI T 1009 om-10.

2. A fibrous composite product, comprising: a fiber web comprising glass fibers; and an at least partially cured strengthening resin, wherein prior to curing, the strengthening resin comprises: an aldehyde-based resin; and a crosslinked resin comprising a polyamidoamine backbone at least partially crosslinked by a symmetric crosslink and comprising azetidinium functional groups; wherein the aldehyde-based resin is present in the strengthening resin in an amount of about 85% to about 99.5%, based on the combined solids weight of the crosslinked resin and the aldehyde-based resin, wherein the at least partially cured strengthening resin is present in the fibrous composite product in an amount of about 10% to about 40%, based on the combined solids weight of the fiber web and the at least partially cured strengthening resin, wherein the fibrous composite product has an average Elmendorf tear strength of about 400 gf to about 800 gf, and wherein the fibrous composite product has an average dry tensile strength of about 38.6 kg/7.62 cm (about 85 lbs/3") to about 90.7 kg/7.62 cm (about 200 lbs/3"), as measured according to TAPPI/ANSI T 1009 om-10.

3. A method for making a fibrous composite product, comprising: combining a polyamidoamine and a symmetric crosslinker to produce an intermediate crosslinked prepolymer; combining the intermediate crosslinked prepolymer and an epihalohydrin to produce a crosslinked resin comprising a polyamidoamine backbone at least partially crosslinked by the symmetric crosslinker; combining the crosslinked resin and an aldehyde-based resin to produce a strengthening resin; combining the strengthening resin and a fiber web to produce a fibrous mat; and at least partially curing the strengthening resin within the fibrous mat to produce the fibrous composite product comprising the fiber web and the at least partially cured strengthening resin, wherein the fibrous composite product has an average Elmendorf tear strength of about 400 gf to about 800 gf, and wherein the fibrous composite product has an average dry tensile strength of about 38.6 kg/7.62 cm (about 85 lbs/3") to about 90.7 kg/7.62 cm (about 200 lbs/3"), as measured according to TAPPI/ANSI T 1009 om-10.

4. The method according to paragraph 3, wherein the polyamidoamine backbone at least partially crosslinked by the symmetric crosslink is also at least partially crosslinked by an epihalohydrin crosslink.

5. The method according to paragraph 3, wherein the fiber web comprises glass fibers, mineral fibers, synthetic fibers, or any mixture thereof.

6. The method according to paragraph 3, wherein the strengthening resin is cured within the fibrous mat to produce the fibrous composite product at a temperature of about 100° C. to about 350° C. for about 1 second to about 5 minutes.

7. The method according to paragraph 3, wherein: the aldehyde-based resin is present in the strengthening resin in an amount of about 85% to about 99.5%, based on the combined solids weight of the crosslinked resin and the aldehyde-based resin, and the at least partially cured strengthening resin is present in the fibrous composite product in an amount of about 10% to about 40%, based on the combined solids weight of the fiber web and the at least partially cured strengthening resin.

8. The fibrous composite product or the method according to any one of paragraphs 1-7, wherein the polyamidoamine backbone at least partially crosslinked by the symmetric crosslink is also at least partially crosslinked by an epihalohydrin crosslink.

9. The fibrous composite product or the method according to paragraph 8, wherein the symmetric crosslink is a reaction product of N,N'-methylenebisacrylamide, and wherein the epihalohydrin crosslink is a reaction product of epichlorohydrin.

10. The fibrous composite product or the method according to any one of paragraphs 1-9, wherein the fibrous composite product has an average dry tensile strength of about 40.8 kg/7.62 cm (about 90 lbs/3") to about 68 kg/7.62 cm (about 150 lbs/3").

11. The fibrous composite product or the method according to any one of paragraphs 1-10, wherein the fibrous composite product has an average Elmendorf tear strength of about 400 gf to about 800 gf.

12. The fibrous composite product or the method according to any one of paragraphs 1-11, wherein the fibrous composite product has a basis weight of about 0.73 kg/9.29 m$^2$ (about 1.6 lbs/100 ft$^2$) to about 0.82 kg/9.29 m$^2$ (about 1.8 lbs/100 ft$^2$).

13. The fibrous composite product or the method according to any one of paragraphs 1-12, wherein the at least partially cured strengthening resin is present in the fibrous composite product in an amount of about 15% to about 30%, and wherein the fiber web is present in the fibrous composite product in an amount of about 70% to about 85%, based on the combined weight of the at least partially cured strengthening resin and the fiber web.

14. The fibrous composite product or the method according to any one of paragraphs 1-13, wherein the crosslinked resin has a charge density of about 1 mEq/g of solids to about 4 mEq/g of solids.

15. The fibrous composite product or the method according to any one of paragraphs 1-14, wherein the crosslinked resin is present in the strengthening resin in an amount of about 0.5% to about 10%, based on the combined solids weight of the crosslinked resin and the aldehyde-based resin.

16. The fibrous composite product or the method according to any one of paragraphs 1-15, wherein the crosslinked resin has a weight average molecular weight of about 20,000 to about 3,000,000.

17. The fibrous composite product or the method according to any one of paragraphs 1-16, wherein the crosslinked resin comprises a reaction product of a crosslinked intermediate compound and an epihalohydrin, and wherein the crosslinked intermediate compound is a reaction product of a polyamidoamine and a bisacrylamide.

18. The fibrous composite product or the method according to any one of paragraphs 1-17, wherein the aldehyde-based resin comprises a urea-formaldehyde resin, a phenol-formaldehyde resin, a resorcinol-formaldehyde resin, a phenol-resorcinol-formaldehyde resin, a phenol-urea-formaldehyde resin, a melamine-formaldehyde resin, a melamine-urea-formaldehyde resin, a phenol-melamine-formaldehyde resin, or any mixture thereof.

19. The fibrous composite product or the method according to any one of paragraphs 1-18, wherein the fiber web comprises glass fibers, mineral fibers, synthetic fibers, or any mixture thereof 20. A fibrous composite product, comprising: a plurality of fibers; and an at least partially cured strengthening resin, wherein, prior to curing, the strengthening resin comprises about 85% to about 99.5% of an aldehyde-based resin and about 0.5% to about 15% of a crosslinked resin, based on a combined solids weight of the aldehyde based resin and the crosslinked resin, wherein the crosslinked resin comprises a polyamine at least partially crosslinked by a symmetric crosslink and has azetidinium functional groups, and wherein the fibrous composite product comprises about 10% to about 40% of the at least partially cured strengthening resin, based on a combined solids weight of the plurality of fibers and the at least partially cured strengthening resin.

21. The fibrous composite product according to paragraph 20, wherein the fibrous composite product is a fiber web and has an average dry tensile strength of about 38.6 kg/7.62 cm to about 90.7 kg/7.62 cm, as measured according to TAPPI/ANSI T 1009 om-10.

22. The fibrous composite product according to paragraph 20 or 21, wherein the polyamine at least partially crosslinked by the symmetric crosslink is also at least partially crosslinked by an epihalohydrin crosslink.

23. The fibrous composite product according to any one of paragraphs 20 to 22, wherein the symmetric crosslink is derived from N,N'-methylenebisacrylamide, and wherein the epihalohydrin crosslink is derived from epichlorohydrin.

24. The fibrous composite product according to any one of paragraphs 20 to 23, wherein the fibrous composite product is a fiber web and has an average dry tensile strength of about 40.8 kg/7.62 cm to about 68 kg/7.62 cm, as measured according to TAPPI/ANSI T 1009 om-10.

25. The fibrous composite product according to any one of paragraphs 20 to 24, wherein the fibrous composite product is a fiber web and has an average Elmendorf tear strength of about 400 gf to about 800 gf, as measured according to T 1006 sp-15.

26. The fibrous composite product according to any one of paragraphs 20 to 25, wherein the fibrous composite product has a basis weight of about 0.73 kg/9.29 $m^2$ to about 0.82 kg/9.29 $m^2$.

27. The fibrous composite product according to any one of paragraphs 20 to 26, wherein the fibrous composite product comprises about 15% to about 30% of the at least partially cured strengthening resin, based on the combined solids weight of the plurality of fibers and the at least partially cured strengthening resin.

28. The fibrous composite product according to any one of paragraphs 20 to 27, wherein the crosslinked resin has a charge density of about 1 mEq/g of solids to about 4 mEq/g of solids.

29. The fibrous composite product according to any one of paragraphs 20 to 28, wherein the strengthening resin comprise about 90% to about 99.5% of the aldehyde-based resin, based on the combined solids weight of the aldehyde-based resin and the crosslinked resin.

30. The fibrous composite product according to any one of paragraphs 20 to 29, wherein the crosslinked resin comprises a reaction product of a crosslinked intermediate compound and an epihalohydrin, and wherein the crosslinked intermediate compound comprises a reaction product of a polyamidoamine and a bisacrylamide.

31. The fibrous composite product according to any one of paragraphs 20 to 30, wherein the aldehyde-based resin comprises a urea-formaldehyde resin, a phenol-formaldehyde resin, a resorcinol-formaldehyde resin, a phenol-resorcinol-formaldehyde resin, a phenol-urea-formaldehyde resin, a melamine-formaldehyde resin, a melamine-urea-formaldehyde resin, a phenol-melamine-formaldehyde resin, or any mixture thereof.

32. The fibrous composite product according to any one of paragraphs 20 to 31, wherein the plurality of fibers comprises glass fibers, mineral fibers, synthetic fibers, or any mixture thereof 33. A fibrous composite product, comprising: a fiber web; and an at least partially cured strengthening resin, wherein prior to curing, the strengthening resin comprises about 85% to about 99.5% of a urea-formaldehyde resin and about 0.5% to about 15% of a crosslinked resin, based on a combined solids weight of the urea-formaldehyde resin and the crosslinked resin, wherein the crosslinked resin comprises a polyamidoamine at least partially crosslinked by a symmetric crosslink and has azetidinium functional groups, and wherein the fibrous composite product comprises about 10% to about 20% of the at least partially cured strengthening resin, based on a combined solids weight of the plurality of fibers and the at least partially cured strengthening resin.

34. The fibrous composite product according to paragraph 33, wherein the symmetric crosslink comprises a reaction product of the polyamidoamine and N,N'-methylenebisacrylamide.

35. The fibrous composite product according to paragraph 33 or 34, wherein the polyamidoamine at least partially crosslinked by the symmetric crosslink is also at least partially crosslinked by an epihalohydrin crosslink.

36. The fibrous composite product according to any one of paragraphs 33 to 35, wherein the fibrous composite product is a fiber web and has an average dry tensile strength of about 38.6 kg/7.62 cm to about 90.7 kg/7.62 cm, as measured according to TAPPI/ANSI T 1009 om-10.

37. The fibrous composite product according to any one of paragraphs 33 to 36, wherein the fibrous composite product is a fiber web and has an average dry tensile strength of about 40.8 kg/7.62 cm to about 68 kg/7.62 cm, as measured according to TAPPI/ANSI T 1009 om-10.

38. The fibrous composite product according to any one of paragraphs 33 to 37, wherein the fibrous composite product is a fiber web and has an average Elmendorf tear strength of about 400 gf to about 800 gf, as measured according to T 1006 sp-15.

39. The fibrous composite product according to any one of paragraphs 33 to 38, wherein the fibrous composite product has a basis weight of about 0.73 kg/9.29 $m^2$ to about 0.82 kg/9.29 $m^2$.

40. The fibrous composite product according to any one of paragraphs 33 to 39, wherein the crosslinked resin has a charge density of about 1 mEq/g of solids to about 4 mEq/g of solids.

41. The fibrous composite product according to any one of paragraphs 33 to 40, wherein the fiber web comprises a plurality of fibers.

42. The fibrous composite product according to paragraph 41, wherein the plurality of fibers comprises glass fibers, mineral fibers, synthetic fibers, or any mixture thereof.

43. A method for making a fibrous composite product, comprising: contacting a plurality of fibers with a strengthening resin, wherein the strengthening resin comprises about 85% to about 99.5% of an aldehyde-based resin and about 0.5% to about 15% of a crosslinked resin, based on a combined solids weight of the aldehyde-based resin and the crosslinked resin, and wherein the crosslinked resin comprises a polyamine at least partially crosslinked by a symmetric crosslink and has azetidinium functional groups; and at least partially curing the strengthening resin in contact with the plurality of fibers to produce the fibrous composite product, wherein the fibrous composite product comprises about 10% to about 40% of the at least partially cured strengthening resin, based on a combined solids weight of the plurality of fibers and the at least partially cured strengthening resin.

44. The method according to paragraph 43, wherein the fibrous composite product is a fiber web and has an average Elmendorf tear strength of about 400 gf to about 800 gf, as measured according to T 1006 sp-15.

45. The method according to paragraph 43 or 44, wherein the fibrous composite product is a fiber web and has an average dry tensile strength of about 38.6 kg/7.62 cm to about 90.7 kg/7.62 cm, as measured according to TAPPI/ANSI T 1009 om-10.

46. The method according to any one of paragraphs 43 to 45, wherein the strengthening resin in contact with the plurality of fibers is cured by heating the strengthening resin to a temperature of about 100° C. to about 350° C. for about 1 second to about 5 minutes.

47. The method according to any one of paragraphs 43 to 46, wherein the symmetric crosslink comprises a reaction product of the polyamine and N,N'-methylenebisacrylamide.

48. The method according to any one of paragraphs 43 to 47, wherein the fibrous composite product is a fiber web and has an average dry tensile strength of about 40.8 kg/7.62 cm to about 68 kg/7.62 cm, as measured according to TAPPI/ANSI T 1009 om-10.

49. The method according to any one of paragraphs 43 to 48, wherein the fibrous composite product has a basis weight of about 0.73 kg/9.29 m$^2$ to about 0.82 kg/9.29 m$^2$.

50. The method according to any one of paragraphs 43 to 49, wherein the crosslinked resin has a charge density of about 1 mEq/g of solids to about 4 mEq/g of solids.

51. The fibrous composite product or the method according to any one of paragraphs 20 to 50, wherein the symmetric crosslink is derived from a diacrylate, a bis(acrylamide), a diepoxide, a polyazetidinium compound, a diisocyanates, a 1,3-dialkyldiazetidine-2,4-dione, a dianhydride, a diacyl halide, a dienone, or a dialkyl halide.

52. The fibrous composite product or the method according to any one of paragraphs 20 to 51, wherein the symmetric crosslink is derived from N,N'-methylenebisacrylamide, N,N'-methylenebismethacrylamide, a poly(alkylene glycol) diglycidyl ether, a poly(alkylene glycol) diacrylate, a polyazetidinium compound, any isomer thereof, any alkylated derivative thereof, any salt thereof, or any mixture thereof.

53. The fibrous composite product or the method according to any one of paragraphs 20 to 50, wherein the symmetric crosslink is derived from a compound selected from the group consisting of: a diacrylate, a bis(acrylamide), a bis(methacrylamide), a diepoxide, a polyazetidinium compound, a diisocyanate, a 1,3-dialkyldiazetidine-2,4-dione, a dianhydride, a diacyl halide, a dienone, a dialkyl halide, and a dialdehyde.

54. The fibrous composite product or the method according to any one of paragraphs 20 to 32 or 43 to 53, wherein the aldehyde-based resin comprises urea-formaldehyde.

55. A composite product, comprising: a plant nutrient; and an at least partially cured strengthening resin, wherein prior to curing, the strengthening resin comprises: an aldehyde-based resin; and a crosslinked resin comprising a polyamidoamine backbone at least partially crosslinked by a symmetric crosslink and comprising azetidinium functional groups; wherein the aldehyde-based resin is present in the strengthening resin in an amount of about 85% to about 99.5%, based on the combined solids weight of the crosslinked resin and the aldehyde-based resin.

56. A method for making a composite product, comprising: combining a polyamidoamine and a symmetric crosslinker to produce an intermediate crosslinked prepolymer; combining the intermediate crosslinked prepolymer and an epihalohydrin to produce a crosslinked resin comprising a polyamidoamine backbone at least partially crosslinked by the symmetric crosslinker; combining the crosslinked resin and an aldehyde-based resin to produce a strengthening resin; combining the strengthening resin and a plant nutrient to produce a coated plant nutrient; and at least partially curing the strengthening resin to produce the composite product comprising the plant nutrient and the at least partially cured strengthening resin.

57. The method according to paragraph 56, wherein the polyamidoamine backbone at least partially crosslinked by the symmetric crosslink is also at least partially crosslinked by an epihalohydrin crosslink.

58. The method according to paragraph 56, wherein the strengthening resin is cured to produce the composite product at a temperature of about 100° C. to about 350° C. for about 1 second to about 5 minutes.

59. The method according to paragraph 56, wherein: the aldehyde-based resin is present in the strengthening resin in an amount of about 85% to about 99.5%, based on the combined solids weight of the crosslinked resin and the aldehyde-based resin.

60. The composite product or method according to any one of paragraphs 55 to 59, wherein the polyamidoamine backbone at least partially crosslinked by the symmetric crosslink is also at least partially crosslinked by an epihalohydrin crosslink.

61. The composite product or method according to paragraph 60, wherein the symmetric crosslink is a reaction product of N,N'-methylenebisacrylamide, and wherein the epihalohydrin crosslink is a reaction product of epichlorohydrin.

62. The composite product or method according to any one of paragraphs 55 to 61, wherein the crosslinked resin has a charge density of about 1 mEq/g of solids to about 4 mEq/g of solids.

63. The composite product or method according to any one of paragraphs 55 to 62, wherein the crosslinked resin is present in the strengthening resin in an amount of about 0.5% to about 10%, based on the combined solids weight of the crosslinked resin and the aldehyde-based resin.

64. The composite product or method according to any one of paragraphs 55 to 63, wherein the crosslinked resin has a weight average molecular weight of about 20,000 to about 3,000,000.

65. The composite product or method according to any one of paragraphs 55 to 64, wherein the crosslinked resin comprises a reaction product of a crosslinked intermediate compound and an epihalohydrin, and wherein the crosslinked intermediate compound is a reaction product of a polyamidoamine and a bisacrylamide.

66. The composite product or method according to any one of paragraphs 55 to 65, wherein the aldehyde-based resin comprises a urea-formaldehyde resin, a phenol-formaldehyde resin, a resorcinol-formaldehyde resin, a phenol-resorcinol-formaldehyde resin, a phenol-urea-formaldehyde resin, a melamine-formaldehyde resin, a melamine-urea-formaldehyde resin, a phenol-melamine-formaldehyde resin, or any mixture thereof.

67. A fertilizer composition comprising: a particulate core comprising a plant nutrient; at least one coating layer of a strengthening resin comprising an aldehyde-based resin and a crosslinked resin; and, optionally, at least one coating layer of water insoluble material.

68. The fertilizer composition according to paragraph 67, wherein the aldehyde-based resin is a urea-formaldehyde resin.

69. The fertilizer composition according to paragraph 67 or 68, wherein the strengthening resin comprises the aldehyde-based resin blended with a crosslinked resin comprising a polyamidoamine backbone.

70. The fertilizer composition according to any one of paragraphs 67 to 69, wherein the crosslinked resin comprises a polyamidoamine-epihalohydrin.

71. The fertilizer composition according to any one of paragraphs 67 to 70, wherein the strengthening resin is present in an amount of about 1% to about 50% by weight relative to the weight of the plant nutrient core.

72. The fertilizer composition according to any one of paragraphs 67 to 71, wherein the strengthening resin is present in an amount of about 5% to about 15% by weight relative to the weight of the plant nutrient core.

73. The fertilizer composition according to any one of paragraphs 67 to 72, wherein the strengthening resin and the water insoluble material are present in a weight ratio of 1:5 to about 5:1.

74. The fertilizer composition according to any one of paragraphs 67 to 73, comprising at least two coating layers of the strengthening resin and at least one coating layer of the water insoluble material, and wherein the coating layers alternate.

75. The fertilizer composition according to any one of paragraphs 67 to 74, comprising at least three coating layers of the strengthening resin.

76. The fertilizer composition according to any one of paragraphs 67 to 75, wherein the water insoluble material is selected from the group consisting of waxes, fatty acids, fatty acid esters, C9 or greater alcohols, and combinations thereof 77. A method of making a fertilizer composition comprising: providing particles of a plant nutrient; applying to the plant nutrient particles at least one coating layer of a strengthening resin comprising an aldehyde-based resin; applying to the plant nutrient particles at least one coating layer of a water insoluble material; and curing the composition.

78. The method according to paragraph 77, comprising applying at least two coating layers of the strengthening resin and at least one coating layer of the water insoluble material.

79. The method according to paragraph 77 or 78, wherein the coating layers are applied in an alternating fashion.

80. The method according to any one of paragraphs 77 to 79, comprising applying at least three coating layers of the strengthening resin.

81. A strengthening resin, comprising: about 85% to about 99.5% of an aldehyde-based resin and about 0.5% to about 15% of a crosslinked resin, based on a combined solids weight of the aldehyde based resin and the crosslinked resin, wherein the crosslinked resin comprises a polyamine at least partially crosslinked by a symmetric crosslink and has azetidinium functional groups.

82. The strengthening resin according to paragraph 81, wherein the polyamine at least partially crosslinked by the symmetric crosslink is also at least partially crosslinked by an epihalohydrin crosslink.

83. The strengthening resin according to paragraph 82, wherein the epihalohydrin crosslink is derived from epichlorohydrin.

84. The strengthening resin according to any one of paragraphs 81 to 83, wherein the symmetric crosslink is derived from a diacrylate, a bis(acrylamide), a bis(methacrylamide), a diepoxide, a polyazetidinium compound, a diisocyanate, a 1,3-dialkyldiazetidine-2,4-dione, a dianhydride, a diacyl halide, a dienone, a dialkyl halide, a dialdehyde, or any mixture thereof.

85. The strengthening resin according to any one of paragraphs 81 to 84, wherein the symmetric crosslink is derived from a bis(acrylamide) or a bis(methacrylamide).

86. The strengthening resin according to any one of paragraphs 81 to 85, wherein the symmetric crosslink is derived from a bis(acrylamide).

87. The strengthening resin according to any one of paragraphs 81 to 86, wherein the symmetric crosslink is derived from N,N'-methylenebisacrylamide.

88. The strengthening resin according to any one of paragraphs 81 to 87, wherein the strengthening resin has a solids content of about 10% to about 80%, based on a combined weight of the aldehyde-based resin and the crosslinked resin.

89. The strengthening resin according to any one of paragraphs 81 to 88, wherein the crosslinked resin has a charge density of about 1 mEq/g of solids to about 4 mEq/g of solids.

90. The strengthening resin according to any one of paragraphs 81 to 89, wherein the strengthening resin comprise about 90% to about 99.5% of the aldehyde-based resin, based on the combined solids weight of the aldehyde-based resin and the crosslinked resin.

91. The strengthening resin according to any one of paragraphs 81 to 83 and 88 to 90, wherein the crosslinked resin comprises a reaction product of a crosslinked intermediate compound and an epihalohydrin, and wherein the crosslinked intermediate compound comprises a reaction product of a polyamidoamine and a bisacrylamide.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. And if applicable, all patents, test procedures, and other documents cited in this application are fully incorporated by reference to the extent such disclosure is not inconsistent with this application and for all jurisdictions in which such incorporation is permitted.

While the foregoing is directed to certain illustrative embodiments, other and further embodiments of the invention can be devised without departing from the basic scope thereof, and the scope thereof is determined by the claims that follow.

What is claimed is:

1. A fibrous composite product, comprising:
   a plurality of fibers; and
   an at least partially cured strengthening resin, wherein, prior to curing, the strengthening resin comprises about 85% to about 99.5% of an aldehyde-based resin and about 0.5% to about 15% of a crosslinked resin, based on a combined solids weight of the aldehyde based resin and the crosslinked resin,
   wherein the crosslinked resin comprises a polyamine at least partially crosslinked by a symmetric crosslink and has azetidinium functional groups, and
   wherein the fibrous composite product comprises about 10% to about 40% of the at least partially cured strengthening resin, based on a combined solids weight of the plurality of fibers and the at least partially cured strengthening resin.

2. The fibrous composite product of claim 1, wherein the fibrous composite product is a fiber web and has an average dry tensile strength of about 38.6 kg/7.62 cm to about 90.7 kg/7.62 cm, as measured according to TAPPI/ANSI T 1009 om-10.

3. The fibrous composite product of claim 1, wherein the polyamine at least partially crosslinked by the symmetric crosslink is also at least partially crosslinked by an epihalohydrin crosslink.

4. The fibrous composite product of claim 3, wherein the symmetric crosslink is derived from N,N'-methylenebisacrylamide, and wherein the epihalohydrin crosslink is derived from epichlorohydrin.

5. The fibrous composite product of claim 1, wherein the symmetric crosslink is derived from a compound selected from the group consisting of: a diacrylate, a bis(acrylamide), a bis(methacrylamide), a diepoxide, a polyazetidinium compound, a diisocyanate, a 1,3-dialkyldiazetidine-2,4-dione, a dianhydride, a diacyl halide, a dienone, a dialkyl halide, and a dialdehyde.

6. The fibrous composite product of claim 1, wherein the fibrous composite product is a fiber web and has an average Elmendorf tear strength of about 400 gf to about 800 gf, as measured according to T 1006 sp-15.

7. The fibrous composite product of claim 1, wherein the fibrous composite product has a basis weight of about 0.73 kg/9.29 m² to about 0.82 kg/9.29 m².

8. The fibrous composite product of claim 1, wherein the fibrous composite product comprises about 10% to about 25% of the at least partially cured strengthening resin, based on the combined solids weight of the plurality of fibers and the at least partially cured strengthening resin.

9. The fibrous composite product of claim 1, wherein the crosslinked resin has a charge density of about 1 mEq/g of solids to about 4 mEq/g of solids.

10. The fibrous composite product of claim 1, wherein the strengthening resin comprise about 90% to about 99.5% of the aldehyde-based resin, based on the combined solids weight of the aldehyde-based resin and the crosslinked resin.

11. The fibrous composite product of claim 1, wherein the crosslinked resin comprises a reaction product of a crosslinked intermediate compound and an epihalohydrin, and wherein the crosslinked intermediate compound comprises a reaction product of a polyamidoamine and a bisacrylamide.

12. The fibrous composite product of claim 1, wherein the aldehyde-based resin comprises a urea-formaldehyde resin, a phenol-formaldehyde resin, a resorcinol-formaldehyde resin, a phenol-resorcinol-formaldehyde resin, a phenol-urea-formaldehyde resin, a melamine-formaldehyde resin, a melamine-urea-formaldehyde resin, a phenol-melamine-formaldehyde resin, or any mixture thereof.

13. The fibrous composite product of claim 1, wherein the plurality of fibers comprises glass fibers, mineral fibers, synthetic fibers, or any mixture thereof.

14. The fibrous composite product of claim 1, wherein the plurality of fibers comprises of fibers.

15. A fibrous composite product, comprising:
    a fiber web; and
    an at least partially cured strengthening resin, wherein prior to curing, the strengthening resin comprises about 85% to about 99.5% of a urea-formaldehyde resin and about 0.5% to about 15% of a crosslinked resin, based on a combined solids weight of the urea-formaldehyde resin and the crosslinked resin,
    wherein the crosslinked resin comprises a polyamidoamine at least partially crosslinked by a symmetric crosslink and has azetidinium functional groups, and
    wherein the fibrous composite product comprises about 10% to about 20% of the at least partially cured strengthening resin, based on a combined solids weight of the plurality of fibers and the at least partially cured strengthening resin.

16. The fibrous composite product of claim 15, wherein the symmetric crosslink comprises a reaction product of the polyamidoamine and N,N'-methylenebisacrylamide.

17. The fibrous composite product of claim 16, wherein the polyamidoamine at least partially crosslinked by the symmetric crosslink is also at least partially crosslinked by an epihalohydrin crosslink.

18. A method for making a fibrous composite product, comprising:
    contacting a plurality of fibers with a strengthening resin, wherein the strengthening resin comprises about 85% to about 99.5% of an aldehyde-based resin and about 0.5% to about 15% of a crosslinked resin, based on a combined solids weight of the aldehyde-based resin and the crosslinked resin, and wherein the crosslinked resin comprises a polyamine at least partially crosslinked by a symmetric crosslink and has azetidinium functional groups; and
    at least partially curing the strengthening resin in contact with the plurality of fibers to produce the fibrous composite product, wherein the fibrous composite product comprises about 10% to about 40% of the at least partially cured strengthening resin, based on a combined solids weight of the plurality of fibers and the at least partially cured strengthening resin.

19. The method of claim 18, wherein the fibrous composite product is a fiber web and has at least one of: an average Elmendorf tear strength of about 400 gf to about 800 gf, as measured according to T 1006 sp-15, and an average dry tensile strength of about 38.6 kg/7.62 cm to about 90.7 kg/7.62 cm, as measured according to TAPPI/ANSI T 1009 om-10.

20. The method of claim 18, wherein the strengthening resin in contact with the plurality of fibers is cured by heating the strengthening resin to a temperature of about 100° C. to about 350° C. for about 1 second to about 5 minutes.

21. The method of claim 18, wherein the symmetric crosslink comprises a reaction product of the polyamine and N,N'-methylenebisacrylamide.

* * * * *